(12) United States Patent
Matsuda

(10) Patent No.: US 8,390,888 B2
(45) Date of Patent: Mar. 5, 2013

(54) IMAGE COMPRESSING METHOD, IMAGE COMPRESSING APPARATUS AND IMAGE FORMING APPARATUS

(75) Inventor: Toyohisa Matsuda, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 437 days.

(21) Appl. No.: 12/827,930

(22) Filed: Jun. 30, 2010

(65) Prior Publication Data

US 2011/0001994 A1    Jan. 6, 2011

(30) Foreign Application Priority Data

Jul. 1, 2009    (JP) .................................. 2009-157260

(51) Int. Cl.
*G06F 15/00* (2006.01)

(52) U.S. Cl. ........ 358/1.9; 358/1.18; 382/164; 382/166; 382/232

(58) Field of Classification Search ................... 358/1.9, 358/1.18; 382/232, 243, 166, 164
See application file for complete search history.

(56) References Cited

U.S. PATENT DOCUMENTS 6,701,012 B1    3/2004  Matthews
7,133,565 B2    11/2006  Toda et al.
2009/0263031 A1*  10/2009  Usui et al. ..................... 382/232

FOREIGN PATENT DOCUMENTS

| JP | 3779741 B2 | 2/1996 |
| JP | 2002-94805 A | 3/2002 |
| JP | 2003-18412 A | 1/2003 |

* cited by examiner

*Primary Examiner* — Marivelisse Santiago Cordero
*Assistant Examiner* — Moustapha Diaby
(74) *Attorney, Agent, or Firm* — Birch, Stewart, Kolasch & Birch, LLP

(57) ABSTRACT

A foreground layer generating unit generates a foreground layer on the basis of a foreground mask generated by a foreground mask generating unit and an original image. A binary image processing unit generates N binary images corresponding to N kinds of foreground identifiers on the basis of the foreground layer, and sets a plurality of tiles for each of the N binary images. Further, the binary image processing unit determines whether or not adjacent tiles are to be merged, and then sets tiles obtained by merging tiles determined to be merged, and leaving tiles determined not to be merged as they are. An image compressing unit cuts out rectangular regions from the individual set tiles by employing the binary images, and compresses the rectangular regions.

9 Claims, 25 Drawing Sheets

F I G. 7
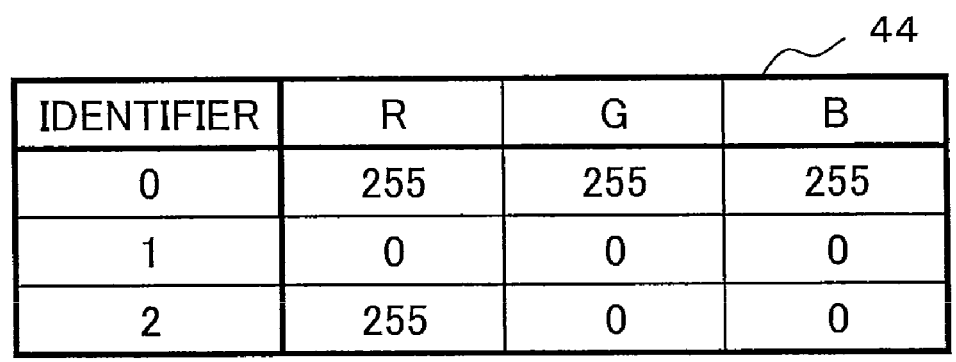

| RECTANGULAR REGION | $x_{min}$ | $x_{max}$ | $y_{min}$ | $y_{max}$ |
|---|---|---|---|---|
| K1 | $x_{K1mi}$ | $x_{K1ma}$ | $y_{K1mi}$ | $y_{K1ma}$ |
| K2 | $x_{K2mi}$ | $x_{K2ma}$ | $y_{K2mi}$ | $y_{K2ma}$ |
| ⋮ | ⋮ | ⋮ | ⋮ | ⋮ |
| R1 | $x_{R1mi}$ | $x_{R1ma}$ | $y_{R1mi}$ | $y_{R1ma}$ |
| R2 | $x_{R2mi}$ | $x_{R2ma}$ | $y_{R2mi}$ | $y_{R2ma}$ |
| ⋮ | ⋮ | ⋮ | ⋮ | ⋮ |

|   | x→ | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|---|
| y↓ | 0 | 0 | 0 | 0 | 0 | 0 | 0 | 0 | 0 | 0 | 0 | 0 | 0 | 0 | 0 | 0 | 0 |
|   | 1 | 0 | 0 | 0 | 0 | 0 | 0 | 0 | 0 | 0 | 0 | 0 | 0 | 0 | 0 | 0 | 0 |
|   | 2 | 0 | 0 | 1 | 0 | 0 | 0 | 0 | 0 | 0 | 1 | 0 | 0 | 0 | 0 | 0 | 0 |
|   | 3 | 0 | 0 | 1 | 0 | 0 | 0 | 0 | 0 | 1 | 1 | 1 | 0 | 0 | 0 | 0 | 0 |
|   | 4 | 0 | 0 | 1 | 1 | 1 | 0 | 0 | 1 | 1 | 1 | 1 | 1 | 0 | 0 | 0 | 0 |
|   | 5 | 0 | 0 | 1 | 1 | 1 | 0 | 0 | 1 | 0 | 1 | 1 | 1 | 0 | 0 | 0 | 0 |
|   | 6 | 0 | 0 | 1 | 1 | 1 | 0 | 0 | 0 | 1 | 1 | 0 | 0 | 0 | 0 | 0 | 0 |
|   | 7 | 0 | 0 | 0 | 0 | 1 | 0 | 0 | 0 | 0 | 1 | 0 | 0 | 0 | 0 | 0 | 0 |
|   | 8 | 0 | 0 | 0 | 0 | 0 | 0 | 0 | 0 | 0 | 0 | 0 | 0 | 0 | 0 | 0 | 0 |
|   | 9 | 0 | 0 | 0 | 0 | 0 | 0 | 0 | 0 | 0 | 0 | 0 | 0 | 0 | 0 | 0 | 0 |
|   | 10 | 0 | 0 | 0 | 0 | 0 | 0 | 0 | 0 | 0 | 0 | 0 | 0 | 0 | 0 | 0 | 0 |
|   | 11 | 0 | 0 | 0 | 0 | 0 | 0 | 0 | 0 | 0 | 0 | 0 | 0 | 0 | 0 | 0 | 0 |
|   | 12 | 0 | 0 | 0 | 0 | 0 | 0 | 0 | 0 | 0 | 0 | 0 | 0 | 0 | 0 | 0 | 0 |
|   | 13 | 0 | 0 | 0 | 0 | 0 | 1 | 1 | 1 | 0 | 0 | 0 | 0 | 0 | 0 | 1 | 1 |
|   | 14 | 0 | 1 | 1 | 0 | 0 | 1 | 1 | 1 | 0 | 0 | 0 | 0 | 0 | 0 | 1 | 1 |
|   | 15 | 0 | 1 | 1 | 0 | 0 | 1 | 0 | 0 | 0 | 0 | 0 | 0 | 0 | 0 | 1 | 1 |
|   | 16 | 0 | 1 | 1 | 1 | 0 | 0 | 0 | 1 | 0 | 0 | 0 | 0 | 0 | 0 | 1 | 1 |
|   | 17 | 0 | 1 | 1 | 0 | 0 | 0 | 0 | 0 | 1 | 0 | 0 | 0 | 0 | 0 | 1 | 1 |
|   | 18 | 0 | 1 | 1 | 0 | 0 | 0 | 0 | 0 | 0 | 0 | 0 | 0 | 0 | 0 | 1 | 1 |
|   | 19 | 0 | 0 | 0 | 0 | 0 | 0 | 1 | 1 | 1 | 1 | 1 | 1 | 1 | 1 | 1 | 1 |

| | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| 0 | 0 | 0 | 0 | 0 | 0 | 0 | 0 | 0 | 0 | 0 | 0 | 0 | 0 | 0 | 0 | 0 |
| 1 | 0 | 0 | 0 | 0 | 0 | 0 | 0 | 0 | 0 | 0 | 0 | 0 | 0 | 0 | 0 | 0 |
| 2 | 0 | 0 | 1 | 0 | 0 | 0 | 0 | 0 | 0 | 1 | 0 | 0 | 0 | 0 | 0 | 0 |
| 3 | 0 | 0 | 1 | 0 | 0 | 0 | 0 | 0 | 1 | 1 | 1 | 0 | 0 | 0 | 0 | 0 |
| 4 | 0 | 0 | 1 | 1 | 1 | 0 | 0 | 1 | 1 | 1 | 1 | 1 | 0 | 0 | 0 | 0 |
| 5 | 0 | 0 | 1 | 1 | 1 | 0 | 0 | 1 | 0 | 1 | 1 | 1 | 0 | 0 | 0 | 0 |
| 6 | 0 | 0 | 1 | 1 | 1 | 0 | 0 | 0 | 0 | 1 | 1 | 0 | 0 | 0 | 0 | 0 |
| 7 | 0 | 0 | 0 | 0 | 1 | 0 | 0 | 0 | 0 | 1 | 0 | 0 | 0 | 0 | 0 | 0 |
| 8 | 0 | 0 | 0 | 0 | 0 | 0 | 0 | 0 | 0 | 0 | 0 | 0 | 0 | 0 | 0 | 0 |
| 9 | 0 | 0 | 0 | 0 | 0 | 0 | 0 | 0 | 0 | 0 | 0 | 0 | 0 | 0 | 0 | 0 |
| 10 | 0 | 0 | 0 | 0 | 0 | 0 | 0 | 0 | 0 | 0 | 0 | 0 | 0 | 0 | 0 | 0 |
| 11 | 0 | 0 | 0 | 0 | 0 | 0 | 0 | 0 | 0 | 0 | 0 | 0 | 0 | 0 | 0 | 0 |
| 12 | 0 | 0 | 0 | 0 | 0 | 0 | 0 | 0 | 0 | 0 | 0 | 0 | 0 | 0 | 0 | 0 |
| 13 | 0 | 0 | 0 | 0 | 0 | 1 | 1 | 1 | 0 | 0 | 0 | 0 | 0 | 0 | 1 | 1 |
| 14 | 0 | 1 | 1 | 0 | 0 | 1 | 1 | 1 | 0 | 0 | 0 | 0 | 0 | 0 | 1 | 1 |
| 15 | 0 | 1 | 1 | 0 | 0 | 0 | 1 | 0 | 0 | 0 | 0 | 0 | 0 | 0 | 1 | 1 |
| 16 | 0 | 1 | 1 | 1 | 0 | 0 | 0 | 1 | 0 | 0 | 0 | 0 | 0 | 0 | 1 | 1 |
| 17 | 0 | 1 | 1 | 0 | 0 | 0 | 0 | 0 | 1 | 0 | 0 | 0 | 0 | 0 | 1 | 1 |
| 18 | 0 | 1 | 1 | 0 | 0 | 0 | 0 | 0 | 0 | 0 | 0 | 0 | 0 | 0 | 1 | 1 |
| 19 | 0 | 0 | 0 | 0 | 0 | 0 | 1 | 1 | 1 | 1 | 1 | 1 | 1 | 1 | 1 | 1 |

F I G. 1 3

| TILE IDENTIFIER | $x_{min}$ | $x_{max}$ | $y_{min}$ | $y_{max}$ |
|---|---|---|---|---|
| 31 | 0 | 3 | 0 | 3 |
| 30 | 4 | 7 | 0 | 3 |
| 32 | 8 | 11 | 0 | 3 |
| 30 | 12 | 15 | 0 | 3 |
| 33 | 0 | 3 | 4 | 7 |
| 33 | 4 | 7 | 4 | 7 |
| 33 | 8 | 11 | 4 | 7 |
| 30 | 12 | 15 | 4 | 7 |
| ⋮ | ⋮ | ⋮ | ⋮ | ⋮ |

F I G. 1 6

| RECTANGULAR REGION | $x_{min}$ | $x_{max}$ | $y_{min}$ | $y_{max}$ |
|---|---|---|---|---|
| K31 | 2 | 2 | 2 | 3 |
| K32 | 8 | 10 | 2 | 3 |
| K33 | 2 | 11 | 4 | 7 |
| K34 | 5 | 7 | 13 | 15 |
| K35 | 14 | 15 | 13 | 15 |
| K36 | 1 | 3 | 14 | 18 |
| K37 | 6 | 15 | 16 | 19 |

FIG. 17

|   | x | | | | | | | | | | | | | | | |
|---|---|---|---|---|---|---|---|---|---|---|---|---|---|---|---|---|
| y | 0 | 1 | 2 | 3 | 4 | 5 | 6 | 7 | 8 | 9 | 10 | 11 | 12 | 13 | 14 | 15 |
| 0 | 0 | 0 | 0 | 0 | 0 | 0 | 0 | 0 | 0 | 0 | 0 | 0 | 0 | 0 | 0 | 0 |
| 1 | 0 | 0 | 0 | 0 | 0 | 0 | 0 | 0 | 0 | 0 | 0 | 0 | 0 | 0 | 0 | 0 |
| 2 | 0 | 0 | 1 | 0 | 0 | 0 | 0 | 0 | 0 | 1 | 0 | 0 | 0 | 0 | 0 | 0 |
| 3 | 0 | 0 | 1 | 0 | 0 | 0 | 0 | 0 | 1 | 1 | 1 | 0 | 0 | 0 | 0 | 0 |
| 4 | 0 | 0 | 1 | 1 | 1 | 0 | 0 | 1 | 1 | 1 | 1 | 1 | 0 | 0 | 0 | 0 |
| 5 | 0 | 0 | 1 | 1 | 1 | 0 | 0 | 1 | 0 | 1 | 1 | 1 | 0 | 0 | 0 | 0 |
| 6 | 0 | 0 | 1 | 1 | 1 | 0 | 0 | 0 | 1 | 1 | 0 | 0 | 0 | 0 | 0 | 0 |
| 7 | 0 | 0 | 0 | 0 | 1 | 0 | 0 | 0 | 1 | 0 | 0 | 0 | 0 | 0 | 0 | 0 |
| 8 | 0 | 0 | 0 | 0 | 0 | 0 | 0 | 0 | 0 | 0 | 0 | 0 | 0 | 0 | 0 | 0 |
| 9 | 0 | 0 | 0 | 0 | 0 | 0 | 0 | 0 | 0 | 0 | 0 | 0 | 0 | 0 | 0 | 0 |
| 10 | 0 | 0 | 0 | 0 | 0 | 0 | 0 | 0 | 0 | 0 | 0 | 0 | 0 | 0 | 0 | 0 |
| 11 | 0 | 0 | 0 | 0 | 0 | 0 | 0 | 0 | 0 | 0 | 0 | 0 | 0 | 0 | 0 | 0 |
| 12 | 0 | 0 | 0 | 0 | 0 | 0 | 0 | 0 | 0 | 0 | 0 | 0 | 0 | 0 | 0 | 0 |
| 13 | 0 | 0 | 0 | 0 | 0 | 1 | 1 | 1 | 0 | 0 | 0 | 0 | 0 | 0 | 1 | 1 |
| 14 | 0 | 1 | 1 | 0 | 0 | 1 | 1 | 1 | 0 | 0 | 0 | 0 | 0 | 0 | 1 | 1 |
| 15 | 0 | 1 | 1 | 0 | 0 | 0 | 1 | 0 | 0 | 0 | 0 | 0 | 0 | 0 | 1 | 1 |
| 16 | 0 | 1 | 1 | 1 | 0 | 0 | 0 | 1 | 0 | 0 | 0 | 0 | 0 | 0 | 1 | 1 |
| 17 | 0 | 1 | 1 | 0 | 0 | 0 | 0 | 0 | 1 | 0 | 0 | 0 | 0 | 0 | 1 | 1 |
| 18 | 0 | 1 | 1 | 0 | 0 | 0 | 0 | 0 | 0 | 0 | 0 | 0 | 0 | 0 | 1 | 1 |
| 19 | 0 | 0 | 0 | 0 | 0 | 0 | 1 | 1 | 1 | 1 | 1 | 1 | 1 | 1 | 1 | 1 |

…

IMAGE COMPRESSING METHOD, IMAGE COMPRESSING APPARATUS AND IMAGE FORMING APPARATUS

CROSS-REFERENCE TO RELATED APPLICATIONS

This Nonprofessional application claims priority under 35 U.S.C. §119 (a) on Patent Application No. 2009-157260 filed in Japan on Jul. 1, 2009, the entire contents of which are hereby incorporated by reference.

BACKGROUND

1. Technical Field

The present invention relates to an image compressing method, an image compressing apparatus, and an image forming apparatus in which an image is compressed.

2. Description of Related Art

In recent years, digital image systems have been remarkably developed, and establishment of digital image processing techniques have been advanced. For example, in the field of digital copiers and digital multi-function peripherals, electronic data obtained by reading a document of a manuscript with a scanner is stored as a document file, or the stored document file is managed. Further, the document file is compressed, and transmitted by e-mail. In general, an image read by a scanner (hereinafter referred to as a scanned image) has a large file size, and hence it is essential to compress the scanned image in order to store or transmit the scanned image.

As one compression technique for compressing a scanned image at a high compression ratio, an image compression technique on the basis of layer separation (e.g., MRC: Mixed Raster Content) has been put into practical use. In the image compression technique on the basis of layer separation, a foreground mask corresponding to a text and/or a line art is extracted from a scanned image to be compressed, the scanned image is separated into a foreground layer and a background layer on the basis of the extracted foreground mask, and the foreground layer and the background layer are compressed by employing respective suitable compression techniques, whereby a highly compressed image is finally generated (see Japanese Patent Application Laid-Open No. 2002-94805 and Japanese Patent No. 3779741).

At this point, a foreground layer is a layer of a foreground corresponding to a text and/or a line art, and is generally compressed by employing a lossless compression technique such as JBIG (Joint Bilevel Image Group), MMR (Modified Modified Read code), LZW (Lempel Ziv Welch), or the like. On the other hand, a background layer is a layer of a background corresponding to an image content other than the text and/or the line art, and is generally compressed by employing a lossy compression technique such as JPEG (Joint Photographic Experts Group) or the like.

Since a compression ratio is easily controlled in the lossy compression technique, priority can be placed on a file size or an image quality in accordance with use of a compressed image. However, since the compression ratio is difficult to control in the lossless compression technique, it is difficult to improve the compression ratio. Accordingly, there has been proposed an image compressing apparatus in which the foreground layer is further separated into a plurality of rectangular regions before being compressed. In each of rectangular regions, a foreground having a specific color, and an area other than the foreground having the specific color are binarized. Consequently, the compression ratio can be improved as compared with the case where a foreground layer including a foreground having a plurality of colors is directly compressed (Japanese Patent Application Laid-Open No. 2003-18412).

For example, in an image compressing apparatus described in Japanese Patent Application Laid Open No. 2003-18412, a document image is converted into a binary image, and a plurality of rectangular regions each including a text are extracted from the binary image. Colors of individual texts included in the extracted rectangular regions are extracted from the document image. When a plurality of text colors are included in each rectangular region, the image compressing apparatus extracts a rectangular region including a text in a specific color from the rectangular region.

Further, the image compressing apparatus appropriately merges rectangular regions each including the text in the specific color before compressing them. Note that the image compressing apparatus merges rectangular regions when a data size obtained when the compression is performed in a state where rectangular regions are not merged is larger than a data size obtained when the compression is performed in a state where rectangular regions are merged. In addition, when the rectangular regions are merged, the image compressing apparatus determines whether or not the mergence is to be performed on a round-robin basis.

SUMMARY

However, in the conventional image compressing apparatus described in Japanese Patent Application Laid-Open No. 2003-18412, even when texts in the specific color included in a rectangular region extracted from the binary image are largely spaced apart from each other, new rectangular regions including the spaced-apart texts can not be separated from the rectangular region. In this case, since the rectangular region includes a large number of texts other than the text in the specific color or backgrounds, data after compression disadvantageously includes a large quantity of unnecessary data. As a result, even when the compression is performed at a high compression ratio, the data quantity after the compression may be large (that is, compression efficiency is reduced).

In order to eliminate such an inconvenience, it can be considered to reduce the size of the rectangular region to be extracted from the binary image. In this case, since the possibility is increased that the spaced-apart texts are included in different rectangular regions separately, the compression efficiency is improved.

However, when the size of the rectangular region to be extracted from the binary image is reduced, the number of rectangular regions to be extracted is increased. As a result, there arises a problem that arithmetic processing time required to determine whether or not the mergence is to be performed on a round-robin basis is prolonged. Further, in order to determine whether or not the mergence is to be performed on the basis of a data size after compression, it is necessary to actually perform the compression, or estimate the data size after the compression. Consequently, there is a problem that the arithmetic processing time required to determine whether or not the mergence is to be performed is long.

Incidentally, when a compressed image generated by employing the image compression technique based on layer separation is decompressed, an original scanned image is reproduced by superimposing a foreground layer and a background layer on each other. When the foreground layer is further separated into a plurality of rectangular regions, a portion where different rectangular regions overlap each other is frequently present. As an area of the portion of the overlapping is larger, or as the number of rectangular regions is larger, arithmetic processing time required to reproduce the scanned image is longer. However, in the conventional image compressing apparatus, importance is placed only on an improvement in the compression ratio of the compressed image, and consideration is not given to a reduction in the arithmetic processing time required to reproduce the scanned image.

The present invention has been devised in consideration of the aforementioned circumstances, and a principal object thereof is to provide an image compressing method, an image compressing apparatus, and an image forming apparatus in which, among tiles obtained by dividing binary images of a foreground layer, adjacent tiles are merged in accordance with areas of minimum rectangular regions each including a specific pixel, and a minimum rectangular region including the specific pixel is then generated for each tile and compressed, whereby each of arithmetic processing time required to obtain a compressed image from an original image, and arithmetic processing time required to reproduce the original image from the compressed image can be reduced while compression efficiency is improved.

An image compressing method according to the present invention is an image compressing method for compressing an image consisting of a plurality of pixels that includes steps of; generating, on the basis of the image, a foreground mask representing individual pixels of a foreground forming a text and/or a line art included in the image; generating, on the basis of the generated foreground mask and the image, a foreground layer obtained by replacing color information of each of the individual pixels of the foreground with N (wherein N is a natural number) kinds of foreground identifiers; generating, on the basis of the generated foreground layer, N binary images obtained by binarizing a specific foreground identifier and a pixel value other than the specific foreground identifier in correspondence to the N kinds of foreground identifiers; setting a plurality of tiles obtained by dividing each of the generated N binary images; determining whether or not, among the set tiles, adjacent tiles are to be merged in accordance with an area of one minimum rectangular region including all of pixels corresponding to a pixel having the specific foreground identifier in the foreground layer included in the adjacent tiles; setting tiles obtained by merging the adjacent tiles determined to be merged, and leaving the adjacent tiles determined not to be merged as they are; generating a minimum rectangular region including all of the pixels included in the set tiles by utilizing the binary images; and compressing the generated rectangular region.

An image compressing apparatus according to the present invention is an image compressing apparatus for compressing an image consisting of a plurality of pixels that includes: a foreground mask generating means for generating, on the basis of the image, a foreground mask representing individual pixels of a foreground forming a text and/or a line art included in the image; a foreground layer generating means for generating, on the basis of the foreground mask generated by the foreground mask generating means and the image, a foreground layer obtained by replacing color information of each of the individual pixels of the foreground with N (wherein N is a natural number) kinds of foreground identifiers; a binary image generating means for generating, on the basis of the foreground layer generated by the foreground layer generating means, N binary images obtained by binarizing a specific foreground identifier and a pixel value other than the specific foreground identifier in correspondence to the N kinds of foreground identifiers; a tile dividing means for setting a plurality of tiles obtained by dividing each of the N binary images generated by the binary image generating means; a mergence determining means for determining whether or not adjacent tiles are to be merged after the tile dividing means sets the tiles in accordance with an area of one minimum rectangular region including all of pixels corresponding to a pixel having the specific foreground identifier in the foreground layer included in the adjacent tiles; a tile setting means for setting tiles obtained by merging the adjacent tiles determined to be merged by the mergence determining means, and leaving the adjacent tiles determined not to be merged by the mergence determining means as they are; a region generating means for generating a minimum rectangular region including all of the pixels included in the tiles set by the tile setting means by employing the binary images; and a region compressing means for compressing the rectangular region generated by the region generating means.

In the present invention, the image compressing method of the present invention is implemented by employing the image compressing apparatus of the present invention to compress an image consisting of a plurality of pixels. In the following description, an image that is not compressed yet is referred to as an original image, while an image obtained by compressing the original image is referred to as a compressed image.

The foreground mask generating means generates the foreground mask on the basis of the original image. The foreground mask represents individual pixels of the foreground forming a text and/or a line art included in the original image. In the present specification, not only a logogram, a syllabogram, and a phonogram but also a figure and a symbol are referred to as texts. The foreground layer generating means generates the foreground layer on the basis of the foreground mask generated by the foreground mask generating means and the original image. The foreground layer is obtained by replacing color information of the individual pixels of the foreground with N kinds of foreground identifiers, wherein N is a natural number.

The binary image generating means generates N binary images in correspondence to N kinds of foreground identifiers on the basis of the foreground layer generated by the foreground layer generating means. Each binary image is obtained by binarizing the specific foreground identifier and a pixel value other than the specific foreground identifier. Accordingly, the binary image generating means converts, e.g., a pixel value of a pixel having the specific foreground identifier into "1", and a pixel value of a pixel having a pixel value other than the specific foreground identifier into "0".

In the case where each of N binary images is compressed, a compression ratio of the compressed image can be improved as compared with the case where the foreground layer including the foreground of N colors is directly compressed. In addition, the number N of binary images is equal to the number N of foreground identifiers (i.e., the number is the minimum number). As a result, arithmetic processing time required to obtain the compressed image from the original image is not extremely prolonged. However, there is a high possibility that each binary image includes a large number of pixels other than a pixel corresponding to a pixel having the specific foreground identifier in foreground layer (hereinafter referred to as a specific-pixel corresponding pixel). Therefore, even when each binary image is compressed, resultant compression efficiency is low.

Consequently, the tile dividing means executes the setting of a plurality of tiles obtained by dividing one binary image with respect to each of the N binary images generated by the binary image generating means. In each binary image, at least one of the tiles includes the specific-pixel corresponding pixel. There is no problem in setting a tile where no specific-pixel corresponding pixel is included. This is because the image compressing apparatus of the present invention does not compress the tile itself, as will be described later.

After the tile dividing means sets the tiles, the mergence determining means determines whether or not adjacent tiles are to be merged. Whether or not the adjacent tiles are to be merged is determined in accordance with an area of one minimum rectangular region including all of the specific-pixel corresponding pixels included in the adjacent tiles. For example, when the area of the minimum rectangular region is not more than a predetermined area (the area of the minimum rectangular region is small), the mergence determining means determines that the adjacent tiles are merged. Reversely, when the area of the minimum rectangular region exceeds the predetermined area (the area of the minimum rectangular region is large), the mergence determining means determines that the adjacent tiles are not merged.

The tile setting means sets tiles obtained by merging the tiles determined to be merged, and leaving the tiles determined not to be merged as they are. By appropriately merging the tiles, the number of tiles can be reduced. However, there is the possibility that each tile includes a large number of pixels other than the specific-pixel corresponding pixel.

Consequently, the region generating means generates a minimum rectangular region by employing the binary image. In the following description, in order to mean generating the minimum rectangular region by employing the binary image, a wording "cutting out the minimum rectangular region" is used. In the individual minimum rectangular regions cut out from the binary image by the region generating means, all specific-pixel corresponding pixels included in the tiles set by the tile setting means are included. In addition to that, the individual minimum rectangular regions each has the smallest area.

Accordingly, each of the cut-out minimum rectangular regions includes, among specific-pixel corresponding pixels included in the binary image, specific-pixel corresponding pixels that are close to each other. In other words, specific-pixel corresponding pixels that are distant from each other can be separated to be positioned in different minimum rectangular regions. Further, the region generating means does not cut out the tiles from the binary image, but cuts out the minimum rectangular regions from the tiles set in the binary image. As the result of the foregoing, the minimum rectangular region includes only a minimum amount of pixels other than the specific-pixel corresponding pixel. That is, a portion where different minimum rectangular regions overlap each other is minimized. In addition, the number of tiles is also minimized with the mergence of tiles so that the number of cut-out minimum rectangular regions is minimized to be not more than the number of tiles.

The region compressing means compresses the minimum rectangular regions cut out by the region generating means. At this time, unnecessary data included in data after the compression is minimum. The background layer is generated and compressed in a conventional manner.

In the image compressing apparatus according to the present invention, the mergence determining means determines that the adjacent tiles are merged when a result of subtracting a sum of areas of a plurality of minimum rectangular regions including the pixels included in the adjacent tiles from an area of the one minimum rectangular region is not more than a predetermined threshold value.

In the present invention, the mergence determining means assumes that adjacent tiles have been merged, and determines an area of one minimum rectangular region including all of the specific-pixel corresponding pixels included in all of the merged tiles (hereinafter referred to as an area of the minimum rectangular region after the mergence). In addition, the mergence determining means assumes that the adjacent tiles are not merged, and determines the sum of areas of a plurality of minimum rectangular regions each including the specific-pixel corresponding pixel including in each of a plurality of tiles that are left divided (hereinafter referred to as a total area of the minimum rectangular regions before the mergence). The area of the minimum rectangular region after the mergence is not less than the total area of the minimum rectangular regions before the mergence.

When the result of subtracting the total area of the minimum rectangular regions before the mergence from the area of the minimum rectangular region after the mergence is not more than the predetermined threshold value, the mergence determining means determines that the adjacent tiles are merged. That is, the mergence determining means determines whether or not the tiles are to be merged on the basis of comparison between an increased area of the minimum rectangular region resulting from the mergence of the tiles and the predetermined threshold value.

When the result of the subtraction is not more than the threshold value, namely, when the increased area of the minimum rectangular region resulting from the mergence of the tiles is small (in other words, the minimum rectangular region after the mergence is not relatively large when compared with the sum of the minimum rectangular regions before the mergence), the minimum rectangular region after the mergence is considered to include only the minimum number of pixels other than the specific-pixel corresponding pixel. Therefore, the mergence determining means determines that adjacent tiles are merged. On the other hand, when the result of the subtraction exceeds the threshold value, namely, when the increased area of the minimum rectangular region resulting from the mergence of the tiles is large (in other words, the minimum rectangular region after the mergence is excessively large when compared with the sum of the minimum rectangular regions before the mergence), the minimum rectangular region after the mergence is considered to have a large number of pixels other than the specific-pixel corresponding pixel. Therefore, the mergence determining means determines that adjacent tiles are not merged.

When determination is made as to whether or not the mergence is to be performed in the manner described above, it is possible to cut out the optimum minimum rectangular region suitable for characteristics of the foreground included in each binary image (by extension, the original image) when compared with, e.g., the case where determination is made as to whether or not the mergence is to be performed according to the result of comparison between the area of the minimum rectangular region after the mergence and a predetermined area. This is because the disposition of the specific-pixel corresponding pixels included in the binary image is reflected in the difference between the area of the minimum rectangular region after the mergence and the total area of the minimum rectangular regions before the mergence.

The image compressing apparatus according to the present invention further includes a first determining means for determining the threshold value to be used by the mergence determining means in accordance with the number of tiles including the pixels among the tiles set by the tile dividing means, and a predetermined upper limit value of the number of tiles including the pixels after the end of the setting by the tile dividing means and before the start of determination by the mergence determining means.

The image compressing apparatus according to the present invention further includes a second determining means for determining, every time the mergence determining means makes determination, the threshold value to be used by the mergence determining means in accordance with the number of tiles including the pixels among the tiles obtained by merging the adjacent tiles having been determined to be merged by the mergence determining means, and leaving the adjacent tiles having been determined not to be merged by the mergence determining means as they are, and a predetermined upper limit value of the number of tiles including the pixels.

In the present invention, the image compressing apparatus further includes the first (pre-judgment) determining means and/or the second (on-judgment) determining means. The number of minimum rectangular regions cut out by the region generating means is equal to the number of tiles each including the specific-pixel corresponding pixel (hereinafter referred to as the number of specific tiles after the mergence) among the tiles set by the tile setting means. Incidentally, for the number of cut-out minimum rectangular regions, there is a predetermined upper limit value in accordance with a resource such as a memory capacity or an arithmetic capability of the image compressing apparatus (hereinafter referred to as a division upper limit value). Therefore, there is a predetermined division upper limit value also for the number of specific tiles after the mergence.

When the threshold value is too small, the tiles are less likely to be merged, and hence the possibility is increased that the number of specific tiles after the mergence exceeds the division upper limit value. When the number of specific tiles after the mergence exceeds the division upper limit value, it becomes difficult to execute arithmetic processing using the minimum rectangular regions cut out by the region generating means in the image compressing apparatus. In the case where the threshold value is preset to a large value, it is possible to suppress the number of specific tiles after the mergence so as not to exceed the division upper limit value. However, in this case, the number of pixels other than the specific-pixel corresponding pixel included in the cut-out minimum rectangular regions is increased so that compression efficiency is reduced.

In order to eliminate the inconvenience described above, the first determining means determines an optimum threshold value to be used by the mergence determining means after the tile dividing means sets the tiles and before the mergence determining means determines whether or not the tiles are to be merged. In addition, the second determining means determines an optimum threshold value to be used by the mergence determining means every time the mergence determining means determines whether or not the tiles are to be merged. As a result, it is possible to suppress the number of specific tiles after the mergence so as not to exceed the division upper limit value and, at the same time, improve the compression efficiency.

More specifically, the first determining means determines the threshold value in accordance with the number of tiles each including the specific-pixel corresponding pixel (hereinafter referred to as the number of specific tiles before the mergence) among the tiles set by the tile dividing means, and the division upper limit value. In this case, for example, when the number of specific tiles before the mergence is not less than the division upper limit value (or less than the division upper limit value), the use of a large (or a small) threshold value is determined.

On the other hand, the second determining means determines the threshold value in accordance with the number of tiles each including the specific-pixel corresponding pixel (hereinafter referred to as the number of specific tiles during the mergence) among the tiles obtained by merging the tiles having been determined to be merged by the mergence determining means, and leaving the tiles having been determined not to be merged by the mergence determining means as they are, and the division upper limit value. In this case, for example, when the number of specific tiles during the mergence is not less than 50% (or less than 50%) of the division upper limit value, the use of a large (or a small) threshold value is determined.

The disposition of the specific-pixel corresponding pixels included in the binary image is reflected in the number of specific tiles before or during the mergence, while the ability of the image compressing apparatus is reflected in the division upper limit value. Accordingly, with the use of the threshold value determined by the first determining means and/or the second determining means, it is possible to cut out the optimum number, which is based on the ability of the image compressing apparatus, of minimum rectangular regions in an optimum range suitable for the layout of the foreground included in the original image.

In the image compressing apparatus according to the present invention, wherein in the case where the mergence determining means determines not to merge the adjacent tiles, when the number of tiles including the pixels exceeds a predetermined upper limit value of the number of tiles including the pixels, the mergence determining means determines to merge the adjacent tiles.

In the present invention, when the number of specific tiles after the mergence exceeds the division upper limit value as a result of leaving adjacent tiles as they are, the mergence determining means invariably merges the adjacent tiles. As a result, the number of specific tiles after the mergence can be suppressed to be not more than the division upper limit value. In the division upper limit value, the ability of the image compressing apparatus is reflected. Consequently, the maximum number of minimum rectangular regions in accordance with the ability of the image compressing apparatus can be cut out.

In the image compressing apparatus according to the present invention, when any of the pixels is not included in at least one of two adjacent tiles, the mergence determining means determines that the two adjacent tiles are not merged.

In the present invention, when the specific-pixel corresponding pixel is not included in at least one of two adjacent tiles, the mergence determining means determines that the two adjacent tiles are not merged. When no specific-pixel corresponding pixel is included in the two adjacent tiles, the rectangular region is not cut out from these tiles. Therefore, it dose not make sense to merge the two tiles that include no specific-pixel corresponding pixel.

When the specific-pixel corresponding pixel is not included in one of the two adjacent tiles, the rectangular region is not cut out from the tile that does not include the specific-pixel corresponding pixel. In addition, in the case where the tile that does not include the specific-pixel corresponding pixel is sandwiched between two tiles each including the specific-pixel corresponding pixel, when the three tiles are merged, the number of pixels other than the specific-pixel corresponding pixel included in the cut-out minimum rectangular region is increased, and hence it is clear that the compression efficiency is reduced. Consequently, it dose not make sense to merge two tiles of which one tile does not include the specific-pixel corresponding pixel. Thus, by not executing nonsense processing, arithmetic processing can be simplified, and arithmetic processing time can be reduced.

An image forming apparatus according to the present invention includes the image compressing apparatus of the present invention, and an image forming means for forming, on a recording sheet, an image obtained by decompressing an image compressed by the image compressing apparatus, or an image in correspondence to an image inputted to the image compressing apparatus.

In the present invention, the image forming apparatus includes the image compressing apparatus of the present invention and the image forming means, and the image forming means forms the image on the recording sheet. The image formed on the recording sheet is the image obtained by decompressing the image compressed by the image compressing apparatus, or the image in correspondence to the image inputted to the image compressing apparatus. Therefore, the image forming apparatus is capable of reducing arithmetic processing time required to obtain a compressed image from an original image, and arithmetic processing time required to reproduce the original image from the compressed image, while improving the compression efficiency. In addition, the image forming apparatus is capable of forming the reproduced image on the recording sheet. Alternatively, the image forming apparatus is capable of concurrently obtaining the compressed image and the image formed on the recording sheet.

In the present invention, a computer program realizes the foreground mask generating means, the foreground layer generating means, and the like included in the image compressing apparatus of the present invention by using hardware components of a computer in the form of software. According to the computer program of the present invention, a known computer is allowed to function as the image compressing apparatus of the present invention. Note that the computer program of the present invention may be incorporated into a series of image processing programs for causing a computer to execute a process for generating or receiving an original image, a process for reproducing the original image from the compressed image, and the like.

In the present invention, a computer-readable recording medium records the computer program of the present invention. According to the recording medium of the present invention, convenience in distribution or storage for the computer program of the present invention can be improved. Note that, in the recording medium of the present invention, the series of image processing programs in which the computer program of the present invention is incorporated may be recorded.

In the present invention, whether or not tiles are to be merged is determined on the basis of an area of a minimum rectangular region. That is, whether or not the mergence is to be performed can be determined with simple arithmetic processing in reduced arithmetic processing time. In addition, whether or not tiles are to be merged is determined for adjacent tiles. As a result, arithmetic processing time required to determine whether or not the mergence is to be performed can be reduced when compared with the case where the determination is made for tiles on a round-robin basis.

As a result of the foregoing, arithmetic processing time required to obtain the compressed image from the original image can be reduced. Moreover, the number of minimum rectangular regions cut out from the binary image is minimized, and a portion where different minimum rectangular regions overlap each other is also minimized. As a result, the data quantity of the compressed image can be minimized. In other words, compression efficiency can be improved. Furthermore, when the compressed image is decompressed, arithmetic processing time required to reproduce the original image can be reduced.

The above and further objects and features of the invention will more fully be apparent from the following detailed description with accompanying drawings.

BRIEF DESCRIPTION OF THE SEVERAL VIEWS OF THE DRAWINGS

FIG. 7 is a schematic diagram illustrating an index color table related to the foreground layer illustrated in FIG. 5A;

FIG. 10 is a schematic diagram illustrating another exemplary binary image generated by the compression process section included in the image forming apparatus according to Embodiment 1 of the present invention;

FIG. 11 is a schematic diagram illustrating a plurality of tiles obtained by dividing the binary image illustrated in FIG. 10;

FIG. 13 is a schematic diagram illustrating a tile setting table related to the tiles illustrated in FIG. 11 that are assigned with the tile identifiers illustrated in FIG. 12;

FIG. 16 is a schematic diagram illustrating a coordinate table related to rectangular regions cut out from the binary image illustrated in FIG. 10;

FIG. 17 is a schematic diagram illustrating the rectangular regions cut out from the binary image illustrated in FIG. 10;

DETAILED DESCRIPTION

The present invention will be described hereinafter in detail with reference to the accompanying drawings illustrating preferred embodiments.

Embodiment 1

Figure 1:
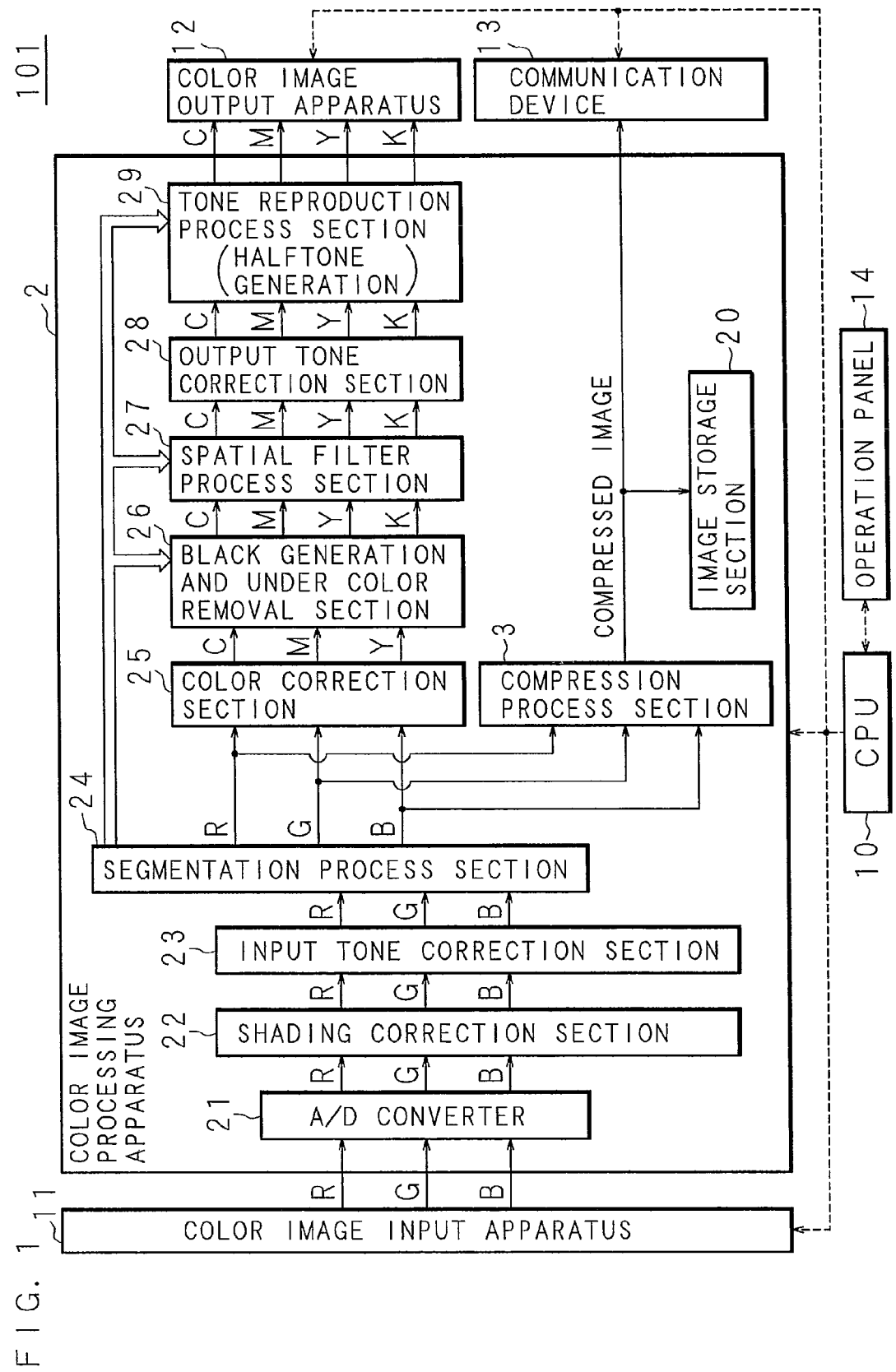
FIG. 1 is a block diagram illustrating a functional configuration of an image forming apparatus according to Embodiment 1 of the present invention.

FIG. 1 is a block diagram illustrating a functional configuration of an image forming apparatus 101 according to Embodiment 1 of the present invention. In the present embodiment, the image forming apparatus 101 that functions as a digital multi-function peripheral having a color copying function, a scan to e-mail function, and the like is described by way of example. The image forming apparatus 101 includes a CPU 10, a color image input apparatus 11, a color image output apparatus 12, a communication device 13, an operation panel 14, and a color image processing apparatus 2.

Figure 2:
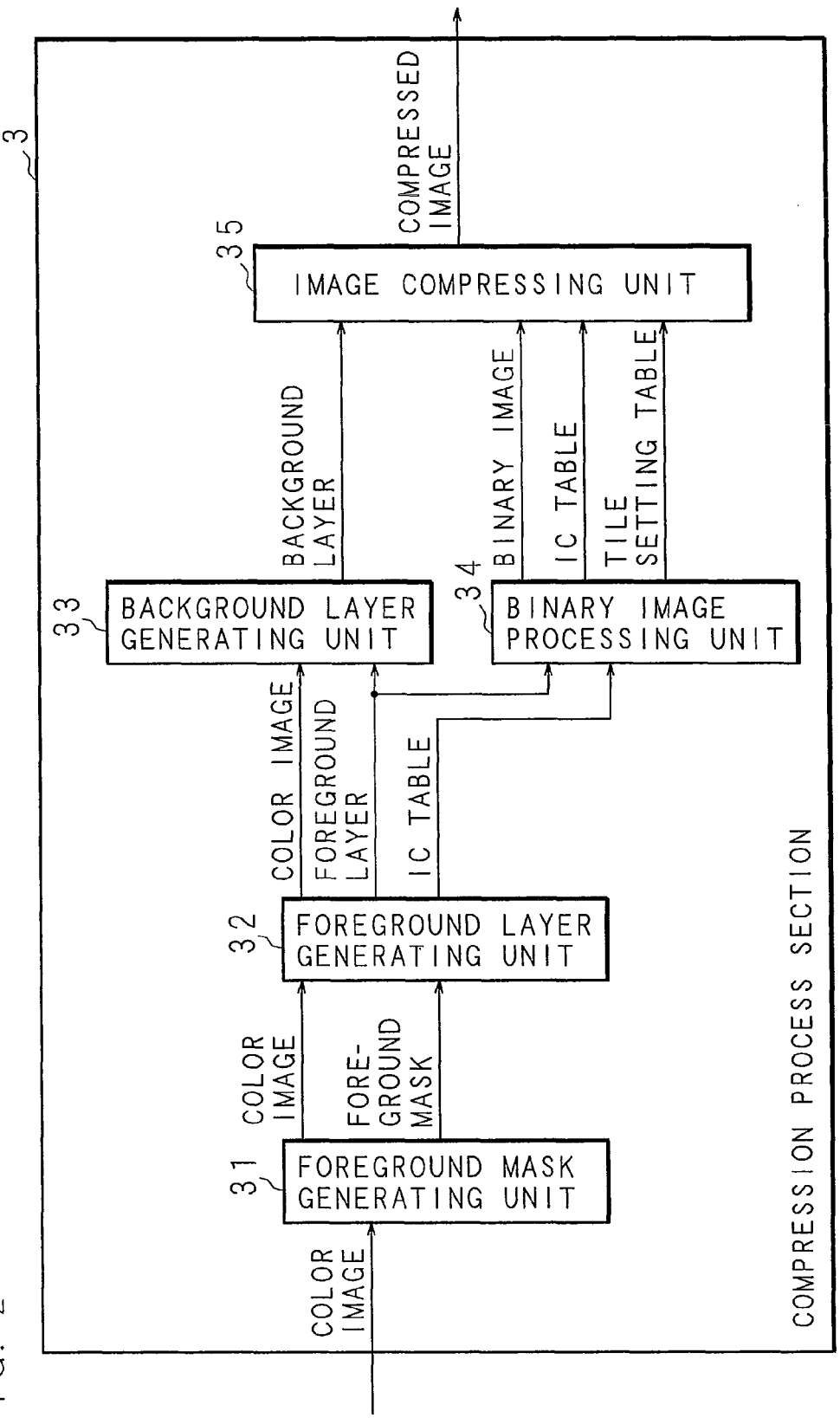
FIG. 2 is a block diagram illustrating a functional configuration of a compression process section included in the image forming apparatus according to Embodiment 1 of the present invention.

The color image processing apparatus 2 includes an image storage section 20, an A/D (analog/digital) converter 21, a shading correction section 22, an input tone correction section 23, a segmentation process section 24, a color correction section 25, a black generation and under color removal section 26, a spatial filter process section 27, an output tone correction section 28, a tone reproduction process section 29, and a compression process section 3 The color image processing apparatus 2 functions as an image compressing apparatus in the embodiment of the present invention. FIG. 2 is a block diagram illustrating a functional configuration of the compression process section 3. The compression process section 3 includes a foreground mask generating unit 31, a foreground layer generating unit 32, a background layer generating unit 33, a binary image processing unit 34, and an image compressing unit 35.

The CPU 10 illustrated in FIG. 1 serves as a control center of the image forming apparatus 101, and uses a volatile memory (not shown) as a working area to control individual components of the apparatus and execute various processes in accordance with a computer program and data stored in a non-volatile memory (not shown). The communication device 13 is comprised of, e.g., a network card connectable to a LAN cable. The communication device 13 communicates with a computer system or other digital multi-function peripherals that are connected to a communication network via the LAN cable.

The operation panel 14 includes an operation unit (not shown) having a mode setting key and a numeric keypad for a user to operate the image forming apparatus 101, and a liquid crystal display for displaying operational instructions for the user, operational statuses of the image forming apparatus 101, or the like. When the user desires a color copying function for a document, the user selects a color copy mode by using the operation panel 14. In addition, when the user desires the storage of a color image read from the document, the user selects an image storage (filling) mode by using the operation panel 14. Further, when the user desires the transmission of the color image read from the document to the outside, the user selects a scan to e-mail mode by using the operation panel 14, and inputs an e-mail address.

The color image input apparatus 11 is connected to an input side of the color image processing apparatus 2. The color image input apparatus 11 is comprised of, e.g., a line sensor having a CCD (Charge Coupled Device). The line sensor converts light reflected from a document into analog RGB (R: red, G: green, B: blue) signals, and then inputs the signals to the color image processing apparatus 2. The RGB signals mentioned herein denote RGB reflectance signals.

The color image output apparatus 12 is connected to an output side of the color image processing apparatus 2. The color image output apparatus 12 is comprised of, e.g., an electrophotographic or an inkjet printer. The printer forms a color image inputted to the color image output apparatus 12 on a recording sheet, and outputs the recording sheet. The color image output apparatus 12 described above functions as an image forming unit in the embodiment of the present invention. In other words, the image forming apparatus 101 of the present embodiment functions as the image forming apparatus in the embodiment of the present invention.

Various image processes in the color image processing apparatus 2 will be described hereinafter in detail. The image storage section 20 is comprised of, e.g., a DDR2 SDRAM, a hard disk, or the like. The analog RGB signals outputted from the color image input apparatus 11 are inputted to the A/D converter 21. The A/D converter 21 converts the analog RGB signals into digital RGB signals, and then outputs the digital RGB signals to the shading correction section 22.

The shading correction section 22 performs, on the digital RGB signals inputted thereto, a signal process for removing various distortions caused in a lighting system, an image focusing system, and an image sensing system. Next, the shading correction section 22 outputs the RGB signals having been subjected to the signal process to the input tone correction section 23. The input tone correction section 23 performs an input tone correction process on the RGB signal inputted thereto. The input tone correction process is a process for adjusting color balance of the RGB signals, or converting the RGB signals into signals (e.g., density signals) that are easily handled in the color image processing apparatus 2. Subsequently, the input tone correction section 23 outputs the RGB signals having been subjected to the input tone correction process to the segmentation process section 24.

The segmentation process section 24 separates (classifies), on the basis of the RGB signals inputted thereto, individual pixels into one of a text segment (line art segment), a halftone segment (intermediate tone segment), and a photograph segment (contone segment). On the basis of the result of the separation, the segmentation process section 24 outputs a segmentation result (a segmentation class signal) indicative of which segment the individual pixels belong to the black generation and under color removal section 26, the spatial filter process section 27, and the tone reproduction process section 29 (see an open arrow in FIG. 1) and, at the same time, outputs the RGB signals inputted thereto directly to the color correction section 25 or the compression process section 3 at the subsequent stage. More specifically, when the user selects the color copy mode, the segmentation process section 24 outputs the RGB signals to the color correction section 25. On the other hand, when the user selects the image storage mode or the scan to e-mail mode, the segmentation process section 24 outputs the RGB signals to the compression process section 3.

Hereinafter, the color copy mode will be firstly described. The color correction section 25 performs a color correction process on the RGB signals inputted thereto. The color correction process is a process for removing color impurity on the basis of spectral characteristics of CMY (C: cyan, M: magenta, Y: yellow) color materials including useless absorption components in order to achieve high fidelity in color reproduction. As a result, the RGB signals are converted into CMY signals. Subsequently, the color correction section 25 outputs the CMY signals to the black generation and under color removal section 26.

The black generation and under color removal section 26 performs a black generation process and a CMY re-generation process on the CMY signals inputted thereto. The black generation process is a process for generating a K (black) signal from the CMY signals on the basis of the segmentation result inputted from the segmentation process section 24, while the CMY re-generation process is a process for generating new CMY signals by subtracting the K signal obtained in the black generation process from the original CMY signals. As a result of the foregoing, the CMY signals (i.e., three-color signals) are converted into CMYK signals (i.e., four-color signals).

At this point, a description will be given of a black generation method using skeleton black as a typical method for performing black generation. In the method, the black generation and under color removal process is represented by the following expressions (1) to (4), wherein input/output characteristics of a skeleton curve are represented by y=f(x), input data are represented by C, M and Y, output data are represented by C', M', Y' and K', and a UCR (Under Color Removal) ratio is represented by α(0<α<1). Note that min (C, M, Y) is a function for selecting a minimum value among arguments of C, M, and Y.

$$K'=f\{\min(C,M,Y)\} \quad (1)$$

$$C'=C-\alpha K' \quad (2)$$

$$M'=M-\alpha K' \quad (3)$$

$$Y'=Y-\alpha K' \quad (4)$$

Subsequently, the black generation and under color removal section 26 outputs the CMYK signals to the spatial filter process section 27. The spatial filter process section 27 performs, on the CMYK signals inputted thereto, a spatial filter process using a digital filter on the basis of the segmentation result inputted from the segmentation process section 24. In the spatial filter process, in order to prevent blurring or graininess degradation of a color image formed on a recording sheet by the color image output apparatus 12, spatial frequency characteristics of the CMYK signals are corrected.

For example, in a segment separated as the text segment by the segmentation process section 24, in order to improve reproducibility of an achromatic text or a chromatic text in particular, a high-frequency component is further enhanced (sharpened) through an edge enhancement process in the spatial filter process. In addition, in a segment separated as the halftone segment by the segmentation process section 24, a low-pass filter process for removing an input halftone component is performed in the spatial filter process section 27. Subsequently, the spatial filter process section 27 outputs the CMYK signals having been subjected to the spatial filter process to the output tone correction section 28.

The output tone correction section 28 performs an output tone correction process for converting the CMYK signals (i.e., density signals) inputted thereto into a halftone area ratio as a characteristic value of the color image output apparatus 12. Subsequently, the output tone correction section 28 outputs the CMYK signals having been subjected to the output tone correction process to the tone reproduction process section 29. The tone reproduction process section 29 performs, on the CMYK signals inputted thereto, a tone reproduction process for forming a high-quality color image on a recording sheet in the color image output apparatus 12 on the basis of the segmentation result inputted from the segmentation process section 24.

In the tone reproduction process, a halftone generation process for reproducing the tone of each pixel is performed on the CMYK signals. For example, with respect to a segment separated as the text segment by the segmentation section 24, a binarization process or a multi-level dithering process in a high-resolution screen suitable for the reproduction of the high-frequency component is performed. Further, with respect to a segment separated as the picture segment by the segmentation section 24, the binarization process or the multi-level dithering process with a screen suitable for tone reproduction is performed. Subsequently, the tone reproduction process section 29 outputs the CMYK signals having been subjected to the tone reproduction process to the color image output apparatus 12.

Note that the color image processing apparatus 2 may also store the CMYK signals outputted from the tone reproduction process section 29 in the image storage section 20, read them from the image storage section 20 at a required timing, and output them to the color image output apparatus 12.

Subsequently, the image storage mode and the scan to e-mail mode will be described. In the following description, the RGB signals inputted from the segmentation process section 24 to the compression process section 3 are also referred to as a color image. The compression process section 3 performs, on the color image inputted thereto, an image compression process on the basis of layer separation (hereinafter referred to as a layer compression process). The layer compression process includes a foreground mask generation process executed in the foreground mask generating unit 31 illustrated in FIG. 2, a foreground layer generation process executed in the foreground layer generating unit 32, a background layer generation process executed in the background layer generating unit 33, a binary image division and mergence process executed in the binary image processing unit 34, and a compressed image generation process executed in the image compressing unit 35.

The compression process section 3, which has performed the layer compression process on the color image, outputs a compressed image of the color image. When the image storage mode is selected, the compressed image outputted from the compression process section 3 is stored in the image storage section 20. The compressed image stored in the image storage section 20 is managed as filing data by the CPU 10.

Incidentally, when a color image is formed on a recording sheet on the basis of a compressed image stored in the image storage section 20, the CPU 10 firstly reads the compressed image from the image storage section 20. Then the CPU 10 inputs the read compressed image to a decompression process section (not shown). As a result, the compressed image is decompressed, and a color image (i.e., RGB signals) is thereby reproduced. Subsequently, the CPU 10 inputs the reproduced RGB signals to the color correction section 25, the black generation and under color removal section 26, the spatial filter process section 27, the output tone correction section 28, and the tone reproduction process section 29 in this order, and then outputs the signals to the color image output apparatus 12.

When the scan to e-mail mode is selected, the compressed image outputted from the compression process section 3 is directly or, after being temporarily stored in the image storage section 20, inputted to the communication device 13. The communication device 13 attaches the compressed image inputted thereto to an e-mail message, and sends the e-mail message to an inputted e-mail address. Incidentally, a user may select the color copy mode and the image storage mode and/or the scan to e-mail mode concurrently. In this case, the segmentation process section 24 outputs the RGB signals to each of the color correction section 25 and the compression process section 3. As a result, the color image is formed on the recording sheet, and the compressed image in correspondence to the color image is also generated.

Note that the image forming apparatus 101 may have a facsimile communication function. The image forming apparatus 101 having the facsimile communication function includes the communication device 13 comprised of, e.g., a facsimile modem. When a user selects a facsimile transmission mode using the operation panel 14, and inputs a destination, the communication device 13 performs a communication procedure with the inputted destination, and transmits the compressed image converted into a facsimile communication format to the destination when a state available for transmission is secured.

The communication device 13 in a facsimile reception mode receives the compressed image in the facsimile communication format sent from a destination while performing the communication procedure with the destination, and inputs the compressed image to the color image processing apparatus 2. The color image processing apparatus 2 performs the decompression process in the decompression process section (not shown) on the received compressed image to reproduce an original image. The reproduced original image is successively inputted to a processing section (not shown) for executing a rotation process and/or a resolution conversion process, the output tone correction section 28, and the tone reproduction process section 29 on an as needed basis, and is outputted to the color image output apparatus 12.

The image forming apparatus 101 in the present embodiment has the color copying function, the image storage function, and the scan to e-mail function, and the image forming apparatus 101 may also have a monochrome copying function, a color printing function, and/or a monochrome printing function. In addition, the color image input apparatus 11 in the present embodiment is a color scanner that reads a document and outputs RGB signals, and the color image input apparatus 11 may also be a monochrome scanner that reads a document and outputs a signal of one component (hereinafter referred to as a monochrome signal). Alternatively, the RGB signals may be converted into the monochrome signal at a stage prior to the compression process section 3, and the monochrome signal may be inputted to the compression process section 3. Further, the image forming apparatus 101 may also be a digital copier having the color copying function and/or the monochrome copying function.

Hereinafter, the layer compression process in the compression process section 3 will be described in detail. With the execution of the layer compression process, one color image is separated into one foreground layer and one background layer, and the background layer is subjected to lossy compression. In addition, the foreground layer is further separated into N binary images. At this point, N is a natural number, and is equal to the number N of kinds of foreground identifiers described later. In a color image, N≧2 is satisfied, while in a monochrome image, N=1 is satisfied.

In the present embodiment, one or a plurality of rectangular regions (will be described later) are cut out from each of the binary images. Next, the cut-out individual rectangular regions are subjected to lossless compression. Then lossless compressed images obtained by lossless compressing the individual rectangular regions, a lossy compressed image obtained by lossy compressing the background layer, and information obtained by lossless compressing information for decompressing the images to reproduce an original image (hereinafter referred to as decompression information) are stored in one file, whereby a compressed image is generated. The decompression information includes an index color table (hereinafter referred to as an IC table) and a coordinate table each described later.

Figure 3:
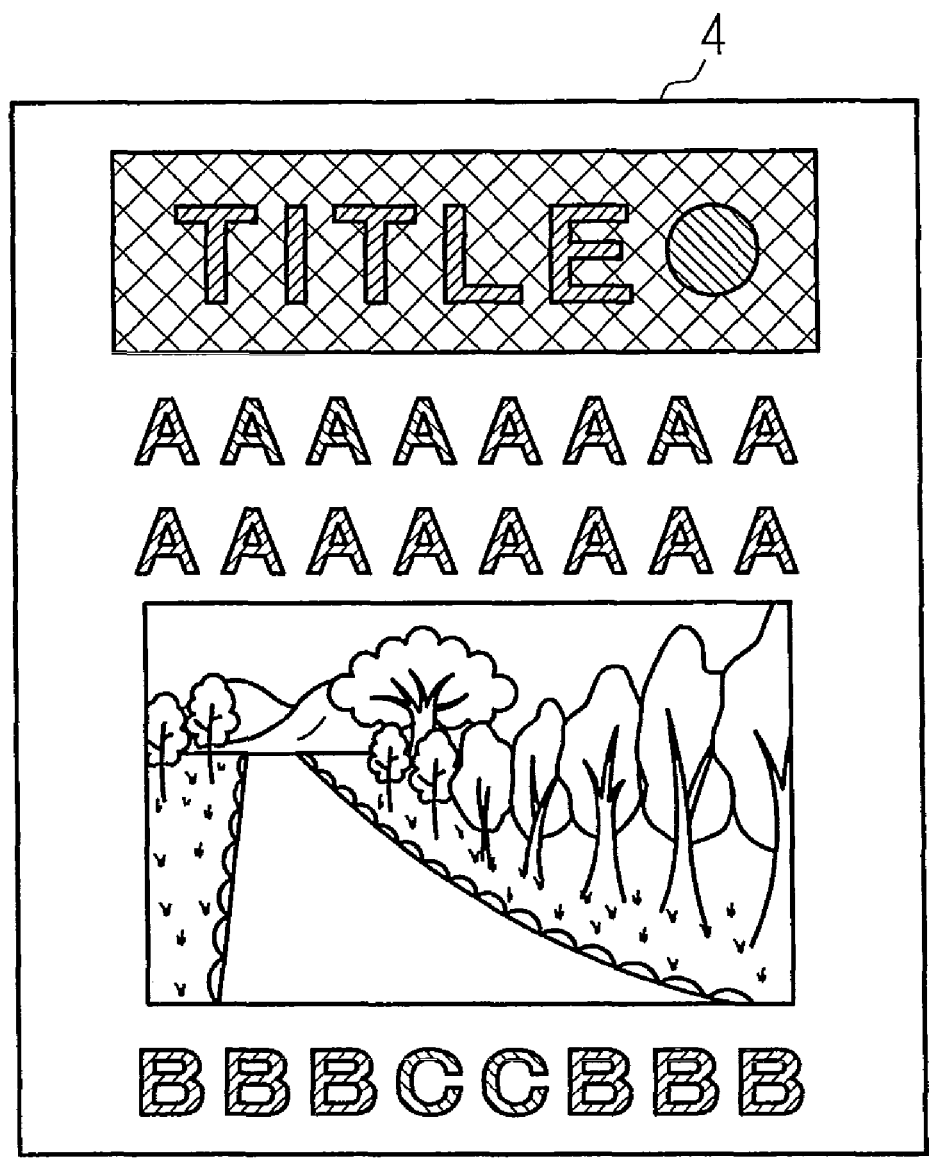
FIG. 3 is a schematic diagram illustrating an exemplary color image subjected to a layer compression process by the compression process section included in the image forming apparatus according to Embodiment 1 of the present invention.
Figure 4:
FIG. 4 is a schematic diagram illustrating a foreground mask generated on the basis of the color image illustrated in FIG. 3.
Figure 5B:
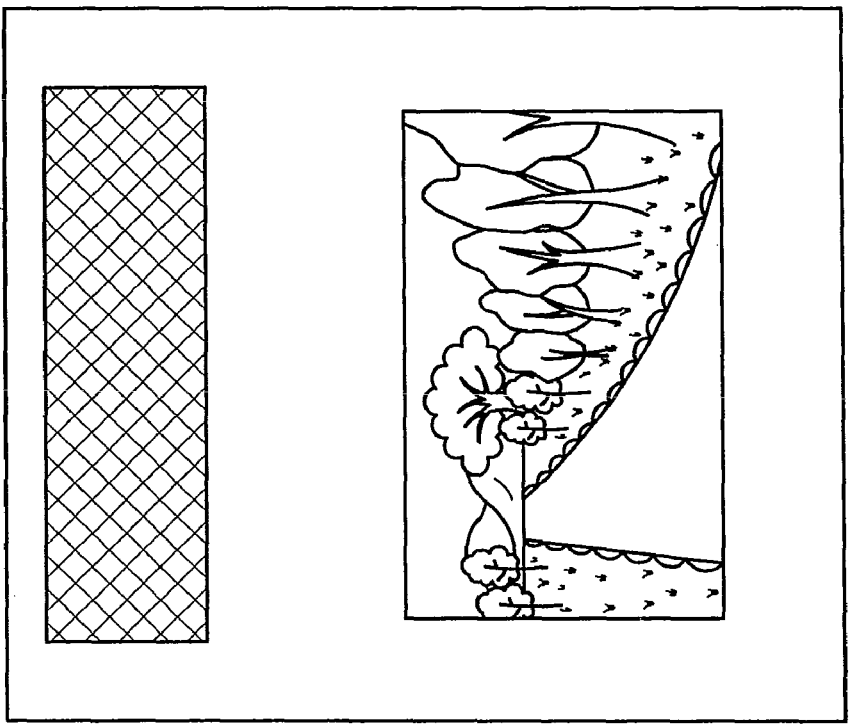
FIGS. 5A and 5B are schematic diagrams illustrating a foreground layer and a background layer that are generated on the basis of the color image illustrated in FIG. 3.
Figure 5A:
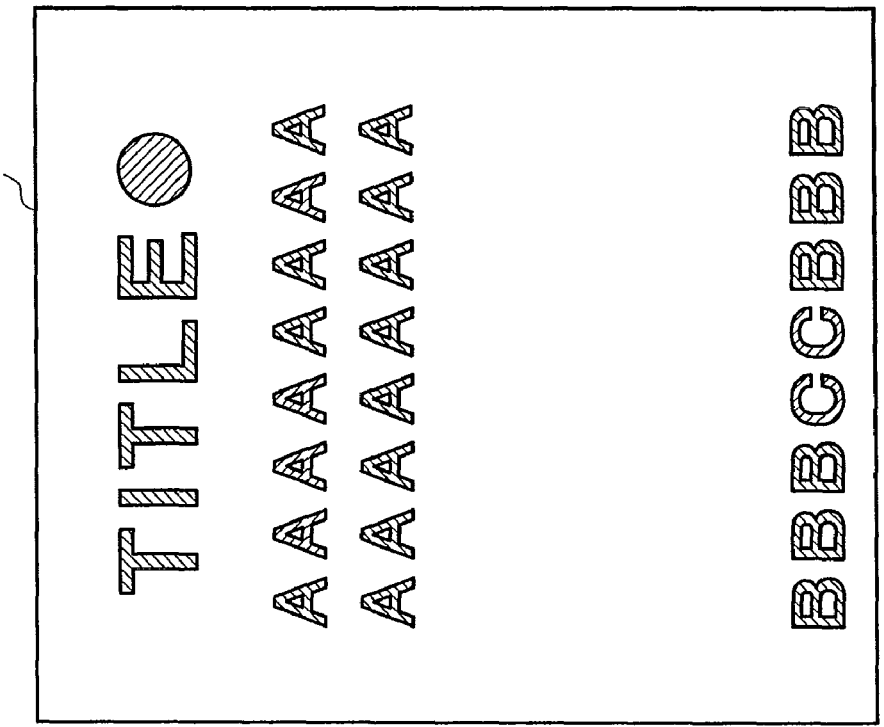

FIG. 3 is a schematic diagram illustrating one color image 4 to be subjected to the layer compression process by the compression process section 3. FIG. 4 is a schematic diagram illustrating one foreground mask 41 generated on the basis of the color image 4 illustrated in FIG. 3. FIG. 5A is a schematic diagram illustrating one foreground layer 42 generated on the basis of the color image 4 illustrated in FIG. 3 and the foreground mask 41 illustrated in FIG. 4, while FIG. 5B is a schematic diagram illustrating one background layer 43 generated on the basis of the color image 4 illustrated in FIG. 3 and the foreground layer 42 illustrated in FIG. 5A.

Figure 6B:
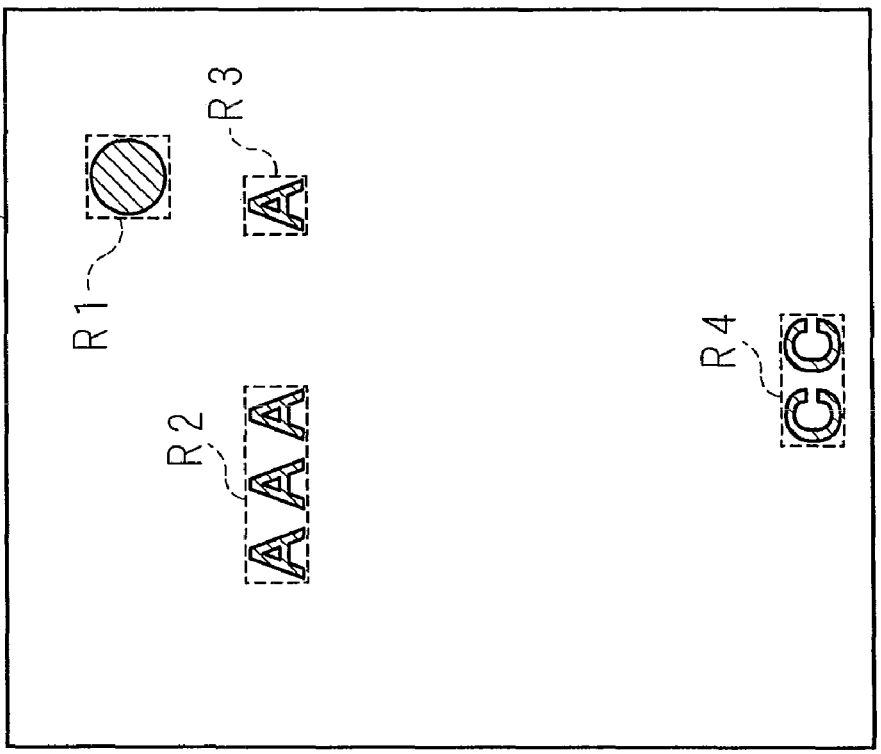
FIGS. 6A and 6B are schematic diagrams illustrating binary images generated on the basis of the foreground layer illustrated in FIG. 5A.
Figure 6A:
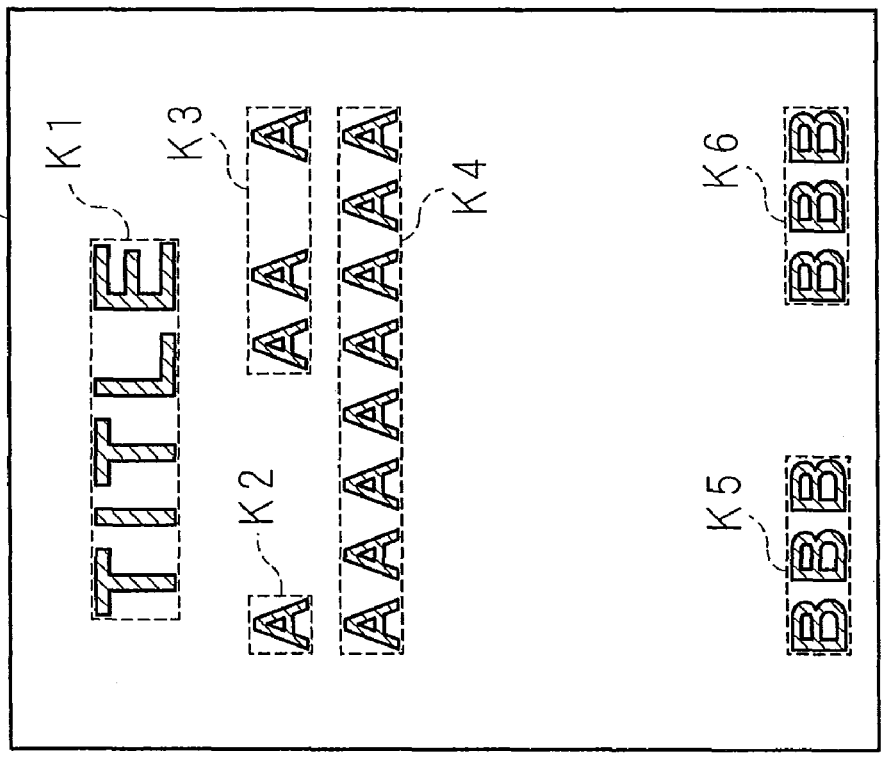
Figure 8:
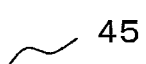
FIG. 8 is a schematic diagram illustrating a coordinate table related to rectangular regions cut out from the binary images illustrated in FIG. 6.

FIGS. 6A and 6B are schematic diagrams illustrating two binary images 42K and 42R each generated on the basis of the foreground layer 42 illustrated in FIG. 5A. FIG. 7 is a schematic diagram illustrating an IC table 44 related to the foreground layer 42 illustrated in FIG. 5A, and FIG. 8 is a schematic diagram illustrating a coordinate table 45 related to rectangular regions K1 to K6, and R1 to R4 that are cut out from the binary images 42K and 42R illustrated in FIGS. 6A and 6B.

The color image 4 illustrated in FIG. 3 is formed on a white recording sheet by using color inks or color toners of black, red, and green. In the drawing, hatching in a right upward direction indicates black, hatching in a right downward direction indicates red, and cross-hatching indicates green. The color image 4 includes a rectangular area in which a white background is filled in with green (hereinafter referred to as a filled-in area), and a landscape having various colors. In addition, the color image 4 includes texts disposed in the filled-in area, and texts disposed in an area where the white background is exposed (hereinafter referred to as a white background area).

In the filled-in area, large achromatic texts (alphabets) constituting a word "TITLE" written in black, and a chromatic text (symbol) "○" written in red are disposed. In the white background area, there are disposed a plurality of small achromatic texts or chromatic texts of "A"s written in black or red, a plurality of small achromatic texts of "B"s, and a plurality of small chromatic texts of "C"s written in red. Among them, the achromatic texts and the chromatic texts correspond to a foreground, and an area other than the foreground corresponds to a background. Specifically, all of the filled-in area, the landscape, and the white background area correspond to the background. Individual pixels constituting this color image 4 have multi-valued color information for directly expressing a large number of colors as pixel values. In the color information in the present embodiment, R, G, and B values are respectively indicated by integers from "0" to "255".

The foreground mask 41 illustrated in FIG. 4 indicates individual pixels constituting the foreground and the background included in the color image 4. In the foreground mask 41, the foreground is expressed only in white, while the background is expressed only in black (hatched area in the drawing). Individual pixels forming the foreground mask 41 have binary pixel values. Specifically, each pixel in the foreground has a pixel value of "0", while each pixel in the background has a pixel value of "1". Accordingly, in the foreground mask 41, it is easy to recognize a pixel having the pixel value of "0" as a pixel of the foreground, and a pixel having the pixel value of "1" as a pixel of the background. In the following description, a pixel belonging to the foreground is referred to as a foreground pixel, a pixel belonging to the background is referred to as a background pixel, and when a distinction between the foreground pixel and the background pixel is not made, a word "a pixel" is simply used.

In the foreground layer 42 illustrated in FIG. 5A, the foreground is expressed in colors of the foreground in the color image 4 illustrated in FIG. 3, and the background is expressed in a predetermined color different from the colors of the foreground. In the foreground layer 42, the achromatic texts and the chromatic texts in the foreground are expressed in black and red, and the background is expressed in white. Note that individual pixels constituting the foreground layer 42 illustrated in FIG. 5A have multi-valued identifiers (indexes) for indirectly expressing a small number of colors as pixel values.

For example, eight kinds of identifiers for expressing eight colors can be indicated as pixel values each having a data length of 3 bits. On the other hand, 16777216 kinds of color information items for expressing 16777216 colors can be indicated as pixel values each having a data length of 24 bits. Consequently, the foreground layer 42 is smaller in data quantity than the color image 4. More specifically, in the foreground layer 42, each foreground pixel has, as a pixel value, one of N kinds of identifiers, and each background pixel has, as a pixel value, one kind of an identifier different from any of the N kinds of identifiers.

In the following description, an identifier of a foreground pixel (i.e., an identifier for distinguishing one color information from another that are included in the foreground) is referred to as a foreground identifier, an identifier of a background pixel (i.e., an identifier for distinguishing the background from the foreground) is referred to as a background identifier, and, when a distinction between the foreground identifier and the background identifier is not made, a word "an identifier" is simply used. Black and red are included in the foreground of the color image 4, and hence the number N of kinds of foreground identifiers satisfies N=2. Further, it is assumed that a foreground identifier indicative of black is "1", a foreground identifier indicative of red is "2", and a background identifier is "0". Accordingly, in the foreground layer 42, it is easy to recognize a pixel having the pixel value of "0" as a background pixel, and pixels having pixel values other than the pixel value of "0" as foreground pixels.

The identifier and the color information used in the foreground layer 42 are associated with each other in one-to-one correspondence, and stored in the IC table 44 illustrated in FIG. 7. In the IC table 44, the identifier "0" (i.e., the background identifier) and the color information of RGB values indicative of white are stored in association with each other. Additionally, in the IC table 44, the identifier "1" (and the identifier "2") and the color information of RGB values indicative of black (and red) are stored in association with each other. This IC table 44 is generated concurrently with the generation of the foreground layer 42 on the basis of the color image 4 and the foreground mask 41.

The color information to be associated with each foreground identifier is color information indicative of one color of the foreground of the color image 4, or color information indicative of a representative color obtained by merging a plurality of colors of the foreground of the color image 4. For example, color information indicative of a color with RGB values of "255", "0", and "0" is associated with one kind of a foreground identifier. Alternatively, color information indicative of a color with RGB values of "255", "17", and "17", which is a representative color obtained by merging a color with RGB values of "255", "0", and "0", a color with RGB values of "255", "51", and "0", and a color with RGB values of "255", "0", and "51", is associated with one kind of a foreground identifier.

Note that, in the IC table 44, there may be stored the number of pixels having each identifier, or coordinate values indicative of the position and the range of the smallest rectangular region including all pixels having each identifier.

In the background layer 43 illustrated in FIG. 5B, a background is expressed in colors of the background in the color image 4, and a foreground is expressed in colors of the background in the color image 4. In the background layer 43, the foreground disposed in the filled-in area (or the white background area) in the color image 4 is expressed in the same color as that of the filled-in area (or the white background area). That is, in the background layer 43, the colors of the foreground in the color image 4 are replaced with (covered with, as it is called) the colors of portions of the background disposed in the vicinity of the foreground. Consequently, in the background layer 43, the foreground pixel can not be distinguished from the background pixel.

The binary image 42K illustrated in FIG. 6A indicates a black portion of the foreground, and the binary image 42R illustrated in FIG. 6B indicates a red portion of the background. These binary images 42K and 42R are obtained by binarizing a specific foreground identifier and pixel values other than the specific foreground identifier that are included in the foreground layer 42. In the binary image 42K, the specific foreground identifier is the foreground identifier "1" indicative of black, and pixel values other than the specific foreground identifier are the foreground identifier "2" and the background identifier "0". Similarly, in the binary image 42R, the specific foreground identifier is the foreground identifier "2" indicative of red, and pixel values other than the specific identifier are the foreground identifier "1" and the background identifier "0".

In the binary images 42K and 42R, pixels corresponding to pixels having the specific foreground identifier in the foreground layer 42 (i.e., specific-pixel corresponding pixels, hatched portions in the drawings) have a pixel value of "1", and pixels other than the specific-pixel corresponding pixels (hereinafter referred to as specific-pixel non-corresponding pixels) have a pixel value of "0". Each of the binary images 42K and 42R includes a large number of specific-pixel non-corresponding pixels. Consequently, six rectangular regions K1 to K6 are cut out from the binary image 42K, while four rectangular regions R1 to R4 are cut out from the binary image 42R.

The coordinate table 45 illustrated in FIG. 8 stores a region identifier for distinguishing one rectangular region from another, and coordinate values for indicating the position and the range of a rectangular region in association with each other. The coordinate values for indicating the position and the range of a rectangular region include a minimum x coordinate value $x_{min}$, a maximum x coordinate value $x_{max}$, a minimum y coordinate value $y_{min}$, and a maximum y coordinate value $y_{max}$ each of a rectangular region. A forward direction of the x axis corresponds to a main scanning direction of the color image 4, while a forward direction of the y axis corresponds to a subscanning direction thereof. In addition, $x_{min}$, $x_{max}$, $y_{min}$, and $y_{max}$ are respectively integers not less than 0, and satisfy $x_{min} \leq x_{max}$, and $y_{min} \leq y_{max}$.

Specifically, in the rectangular region K1, a region identifier "K1" and a minimum x coordinate value $x_{K1\ mi}$, a maximum x coordinate value $x_{K1\ ma}$, a minimum y coordinate value $y_{K1\ mi}$, and a maximum y coordinate value $y_{K1\ ma}$ of the rectangular region K1 are associated with each other. Similarly, in the rectangular region R2, a region identifier "R2", and a minimum x coordinate value $x_{R2\ mi}$, a maximum x coordinate value $x_{R2\ ma}$, a minimum y coordinate value $y_{R2\ mi}$, and a maximum y coordinate value $y_{R2\ ma}$ of the rectangular region R2 are associated with each other.

For example, when $x_{min} = x_{max} = y_{min} = y_{max} = 0$ is satisfied, the rectangular region includes only one pixel at coordinates (x, y)=(0, 0). In this case, this pixel is a specific-pixel corresponding pixel. When $x_{min}=1$, $x_{max}=2$, $y_{min}=3$, and $y_{max}=4$ are satisfied, the rectangular region includes four pixels in a range of coordinates (x, y)=(1, 3) to (2, 4). In addition, at least a pixel at coordinates (x, y)=(1, 3) and a pixel at coordinates (x, y)=(2, 4) are specific-pixel corresponding pixels, or at least a pixel at coordinates (x, =(2, 3) and a pixel at coordinates (x, y)=(1, 4) are specific-pixel corresponding pixels.

In the present embodiment, one coordinate table is generated for N binary images. Accordingly, region identifiers related to different foreground identifiers can be distinguished from each other. Note that coordinate tables may be generated for N binary images in one-to-one correspondence.

Hereinafter, individual components of the compression process section 3 will be described. A color image, which has been outputted to the compression process section 3 from the segmentation process section 24 illustrated in FIG. 1, is inputted to the foreground mask generating unit 31 illustrated in FIG. 2. The foreground mask generating unit 31 generates, on the basis of one color image inputted thereto, one foreground mask by employing a known method. Subsequently, the foreground mask generating unit 31 outputs the color image inputted thereto, and the generated foreground mask to the foreground layer generating unit 32. This foreground mask generating unit 31 functions as a foreground mask generating unit in the embodiment of the present invention.

At this point, a specific example of the foreground mask generation process executed by the foreground mask generating unit 31 will be described (see Japanese Patent No. 3779741). The foreground mask generating unit 31 converts respective RGB values of individual pixels of the color image into luminance values. Subsequently, the foreground mask generating unit 31 detects an edge portion where a luminance is increased to be bright, and an edge portion where a luminance is decreased to be dark by differentiating the luminance values. Further, the foreground mask generating unit 31 determines whether the individual pixels correspond to the foreground or the background on the basis of the detected edge portions. Then the foreground mask generating unit 31 generates an image in which a pixel value of "0" is assigned to pixels determined to correspond to the foreground, and a pixel value of "1" is assigned to pixels determined to correspond to the background, namely, the foreground mask.

The foreground layer generating unit 32 generates, on the basis of one color image and one foreground mask that are inputted thereto, one foreground layer as well as the IC table by employing a known method. Subsequently, the foreground layer generating unit 32 outputs the color image inputted thereto and the generated foreground layer to the background layer generating unit 33, and also outputs the generated foreground layer and IC table to the binary image processing unit 34. Note that the foreground layer generating unit 32 may also output the color image and the foreground mask that are inputted thereto to the background layer generating unit 33.

At this point, a specific example of the foreground layer generation process executed by the foreground layer generating unit 32 will be described (see Japanese Patent Application Laid-Open No. 2002-94805). The foreground layer generating unit 31 sequentially selects individual pixels in the foreground as a target pixel, and determines whether or not color information of the target pixel is stored in the IC table. When the color information of the target pixel is not stored in the IC table yet, the foreground layer generating unit 32 assigns a new foreground identifier to the color information, and causes the IC table to store the color information and the assigned foreground identifier. Further, the foreground layer generating unit 32 replaces the color information of the target pixel with the foreground identifier assigned to the color information.

On the other hand, when the color information of the target pixel is already stored in the IC table, the foreground layer generating unit 32 replaces the color information of the target pixel with the foreground identifier assigned to the color information. In addition, the foreground layer generating unit 32 causes the IC table to store a predetermined background identifier and color information to be associated with the background identifier. Then the foreground layer generating unit 32 collectively replaces color information of individual pixels in the background with the background identifier.

The background layer generating unit 33 generates, on the basis of one color image and the foreground layer that are inputted thereto, one background layer by employing a known method. Then the background layer generating unit 33 outputs the generated background layer to the image compressing unit 35. Note that the background layer generating unit 33 may generate the background layer on the basis of the color image and the foreground mask that are inputted thereto.

At this point, a specific example of the background layer generation process executed by the background layer generating unit 33 will be described (see Japanese Patent Application Laid-Open No. 2002-94805). Japanese Patent Application Laid-Open No. 2002-94805 describes a method in which the foreground mask is used instead of the foreground layer. However, among pixels included in the foreground layer, pixels of the color image in correspondence to pixels having foreground identifiers are regarded to correspond to the foreground, and pixels of the color image in correspondence to pixels having the background identifier are regarded to correspond to the background, whereby the background layer can be generated in the same manner as in the method described in Japanese Patent Application Laid-Open No. 2002-94805.

In this case, the background layer generating unit 33 selects individual foreground pixels of the color image as a target pixel, and covers the target pixel with a pixel value of a background pixel positioned in the vicinity of the target pixel. When the background pixel is not present in the vicinity of the target pixel, namely, when only a foreground pixel is present in the vicinity of the target pixel, the background layer generating unit 33 covers the target pixel with a pixel value of a foreground pixel that has been already covered. Note that the background layer generating unit 33 may also cover the target pixel with an average value of pixel values of a plurality of background pixels instead of a pixel value of one background pixel.

The binary image processing unit 34 generates N binary images on the basis of one foreground layer and the IC table that are inputted thereto. In addition, the binary image processing unit 34 generates a tile setting table described later on the basis of the individual generated binary images. Subsequently, the binary image processing unit 34 outputs the IC table inputted thereto, and the generated binary images and tile setting table to the image compressing unit 35. This binary image processing unit 34 functions as a binary image generating unit, a tile dividing unit, a mergence judging unit, a tile setting unit, a pre-judgment determining unit, and an on-judgment determining unit in the embodiment of the present invention. A binary image division and mergence process (see FIG. 9) executed by the binary image processing unit 34 will be described later.

The image compressing unit 35 generates a compressed image on the basis of one background layer, N binary images, the IC table, and the tile setting table that are inputted thereto. At this time, the image compressing unit 35 cuts out rectangular regions from the individual binary images. Subsequently, the image compressing unit 35 outputs the generated compressed image to the image storage section 20. This image compressing unit 35 functions as a region generating unit and a region compressing unit in the embodiment of the present invention. A compressed image generation process (see FIGS. 14 and 15) executed by the image compressing unit 35 will be described later.

Note that the binary image processing unit 34 may cut out the rectangular regions from the generated individual binary images, and outputs the cut-out rectangular regions to the image compressing unit 35. In this case, the binary image processing unit 34 generates the coordinate table. Therefore, instead of the tile setting table, the coordinate table is outputted from the binary image processing unit 34 to the image processing unit 35. In this case, the binary image processing unit 34 functions as the region generating unit in the embodiment of the present invention.

Figure 9:
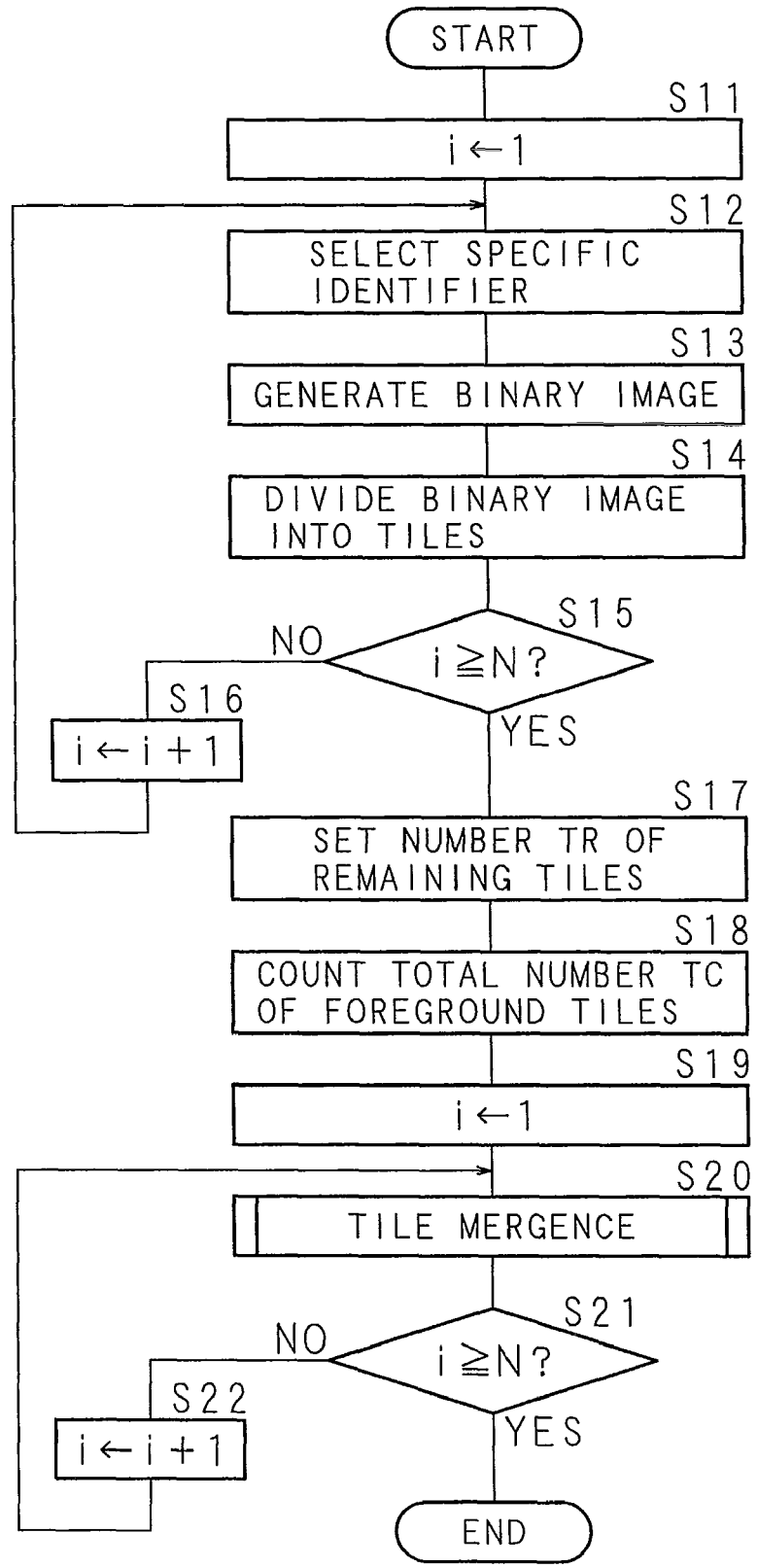
FIG. 9 is a flowchart illustrating procedures in a binary image division and mergence process executed in the compression process section included in the image forming apparatus according to Embodiment 1 of the present invention.

FIG. 9 is a flowchart illustrating procedures in the binary image division and mergence process executed by the binary image processing unit 34. The binary image division and mergence process is executed when the foreground layer and the IC table are inputted to the binary image processing unit 34. The binary image processing unit 34 sets a variable i to an initial value of "1" (S11). Subsequently, the binary image processing unit 34 refers to the IC table to select a foreground identifier "i" as a specific foreground identifier (S12), and generates a binary image obtained by binarizing the foreground identifier "i" and pixel values other than the foreground identifier "i" (S13).

FIG. 10 is a schematic diagram illustrating a binary image 5 generated by the binary image processing unit 34 in the procedure of S13. In the drawing, the horizontal direction corresponds to the x axis direction, while the vertical direction corresponds to the y axis direction. The binary image 5 is an image of 16×20. Accordingly, each pixel is specified by using the x coordinate value satisfying $0 \leq x \leq 15$, and the y coordinate value satisfying $0 \leq y \leq 19$. In the binary image 5, pixels having a pixel value of "1" (pixels indicated by hatching) correspond to specific-pixel corresponding pixels, while pixels having a pixel value of "0" correspond to specific-pixel non-corresponding pixels. The number of pixels in the binary image 5 is 320 and, among them, the number of specific-pixel corresponding pixels is 70. In other words, the binary image 5 includes a large number of specific-pixel non-corresponding pixels. Consequently, when the binary image 5 itself is compressed, compression efficiency is lowered.

Assuming that one minimum rectangular region (rectangular region with the smallest area) including all of the specific-pixel corresponding pixels included in the binary image 5 has been cut out, a minimum rectangular region in a range of coordinates (x, y)=(1, 2) to (15, 19) is obtained. The number of pixels in the minimum rectangular region is 270. Accordingly, the number of specific-pixel non-corresponding pixels is reduced to be smaller than that of specific-pixel non-corresponding pixels included in the binary image 5, but the minimum rectangular region still includes a large number of specific-pixel non-corresponding pixels. Accordingly, even when the minimum rectangular region is compressed, the compression efficiency is poor.

Consequently, there is a need to cut out rectangular regions each with the smallest area from the binary image 5 so as to improve the compression efficiency. However, it is preferable that arithmetic processing for obtaining the rectangular regions is simple, and arithmetic processing time is short. Further, the number of rectangular regions is preferably minimized.

In consideration of the foregoing, the binary image processing unit 34 firstly divides the binary image generated in S13 illustrated in FIG. 9 into a plurality of tiles (S14). A tile division process in S14 is to set a plurality of tiles obtained by dividing one binary image. The result of the division is stored in the tile setting table. The binary image processing unit 34 in S14 functions as the tile dividing unit in the embodiment of the present invention.

FIG. 11 is a schematic diagram illustrating a plurality of tiles obtained by dividing the binary image 5 illustrated in FIG. 10. That is, tiles set by the binary image processing unit 34 in the procedure of S14 are illustrated as an example in FIG. 11. The binary image processing unit 34 in the present embodiment uses a block of 4×4 as one tile. The binary image 5 is divided in a grid-like pattern, and 20(=4×5) tiles are set.

In the tile setting table, coordinate values indicative of the position and the range of each tile are stored. For example, a tile including a pixel at coordinates (x, y)=(0, 0) has the minimum x coordinate value $x_{min}$=0, the maximum x coordinate value $x_{max}$=3, the minimum y coordinate value $y_{min}$=0, and the maximum y coordinate value $y_{max}$=3. In the following description, in order to specify each tile, the minimum x coordinate value $x_{min}$ and the minimum y coordinate value $y_{min}$ are used. For example, a tile including a pixel at coordinates (x, y)=(0, 0) is designated as a tile at coordinates (x, y)=(0, 0).

In each of 12 tiles at coordinates (x, y)=(0, 0), (8, 0), (0, 4), (4, 4), (8, 4), (0, 12), (4, 12), (12, 12), (0, 16), (4, 16), (8, 16), and (12, 16), at least one specific-pixel corresponding pixel is included. In the following description, such a tile is referred to as a foreground tile. In each of 8 tiles at coordinates (x, y)=(4, 0), (12, 0), (12, 4), (0, 8), (4, 8), (8, 8), (12, 8), and (8, 12), only specific-pixel non-corresponding pixels are included. In the following description, such a tile is referred to as a background tile. Further, a word "a tile" is simply used when a distinction between the foreground tile and the background tile is not made. Furthermore, an identifier for distinguishing one unmerged tile from another is referred to as a tile identifier.

Note that the tile size is not limited to 4×4. In addition, in the binary image processing unit 34, tiles of a plurality of sizes may be prepared in advance, and a tile to be used may be changed in accordance with the size of the binary image. Further, the number of divisions of the binary image may be preset instead of the tile size. For example, when the number of divisions of 4×5 is preset, the binary image processing unit 34 sets the tile size related to the binary image 5 to 4×4, while when the number of divisions of 4×4 is preset, the binary image processing unit 34 sets the tile size to 4×5. Furthermore, tiles of different sizes may be set for one binary image 5.

After completing the procedure of S14 illustrated in FIG. 9, the binary image processing unit 34 determines whether or not the variable i is not less than the number N of kinds of foreground identifiers (S15). When i<N is satisfied (NO in S15), the binary image processing unit 34 increments the variable i by "1" (S16), and returns the processing to S12. By repeating the procedures of S12 to S16, each of N binary images is divided into a plurality of tiles. When i≧N is satisfied (YES in S15), each of N binary images has been divided into a plurality of tiles, and hence the binary image processing unit 34 executes the procedures of and after S17.

When one rectangular region is cut out from each of the foreground tiles among tiles set in S14, the number of specific-pixel non-corresponding pixels included in the cut-out rectangular region is extremely small. However, in this case, the number of rectangular regions may be excessively large. Accordingly, in the procedure of S20 described later, foreground tiles are appropriately merged, and one rectangular region is cut out from the entire plurality of merged foreground tiles, whereby the number of cut-out rectangular regions is suppressed.

Incidentally, it is necessary to suppress the total number of rectangular regions cut out from N binary images to be not more than a predetermined upper limit value (i.e., division upper limit value) in accordance with a resource such as a memory capacity or an arithmetic capability of the color image processing apparatus 2. Accordingly, the binary image processing unit 34 sets a number TR of remaining tiles equivalent to the division upper limit value (S17). When the binary image processing unit 34 is provided with the division upper limit value in advance, the procedure of S17 is equivalent to a procedure for setting the variable TR to a predetermined division upper limit value. The number TR of remaining tiles set in the procedure of S17 is gradually reduced with a procedure of S20 described later, but the number TR of remaining tiles is controlled so as not to be negative.

Note that the division upper limit value is a value larger than the number N of kinds of foreground identifiers. This is because, when the division upper limit value is equal to the number N of kinds, there is no choice but to cut out one rectangular region from each of N binary images and, when the division upper limit value is smaller than the number N of kinds, even N rectangular regions cannot be cut out from N binary images.

After completing the procedure of S17, the binary image processing unit 34 counts a total number TC of foreground tiles among tiles set in N binary images (S18). The counting procedure of S18 simply adds up the number of foreground tiles of each of N binary images. For example, when N=2 is satisfied, and the binary image 5 and a binary image having only one tile at coordinates (x, y)=(4, 0) as the foreground tile are present, the total number TC of foreground tiles=13 is satisfied. Similarly, when N=2 is satisfied, and the binary image 5 and a binary image having only one tile at coordinates (x, y)=(4, 4) as the foreground tile are present, the total number TC of foreground tiles=13 is satisfied.

After completing the procedure of S17, the binary image processing unit 34 sets the variable i to the initial value of "1" (S19). Subsequently, the binary image processing unit 34 calls a subroutine for performing a tile mergence process described later (see FIGS. 18 to 21), and executes the tile mergence process (S20). The binary image processing unit 34 in S20 functions as the mergence judging unit and the tile setting unit in the embodiment of the present invention.

Figure 12:
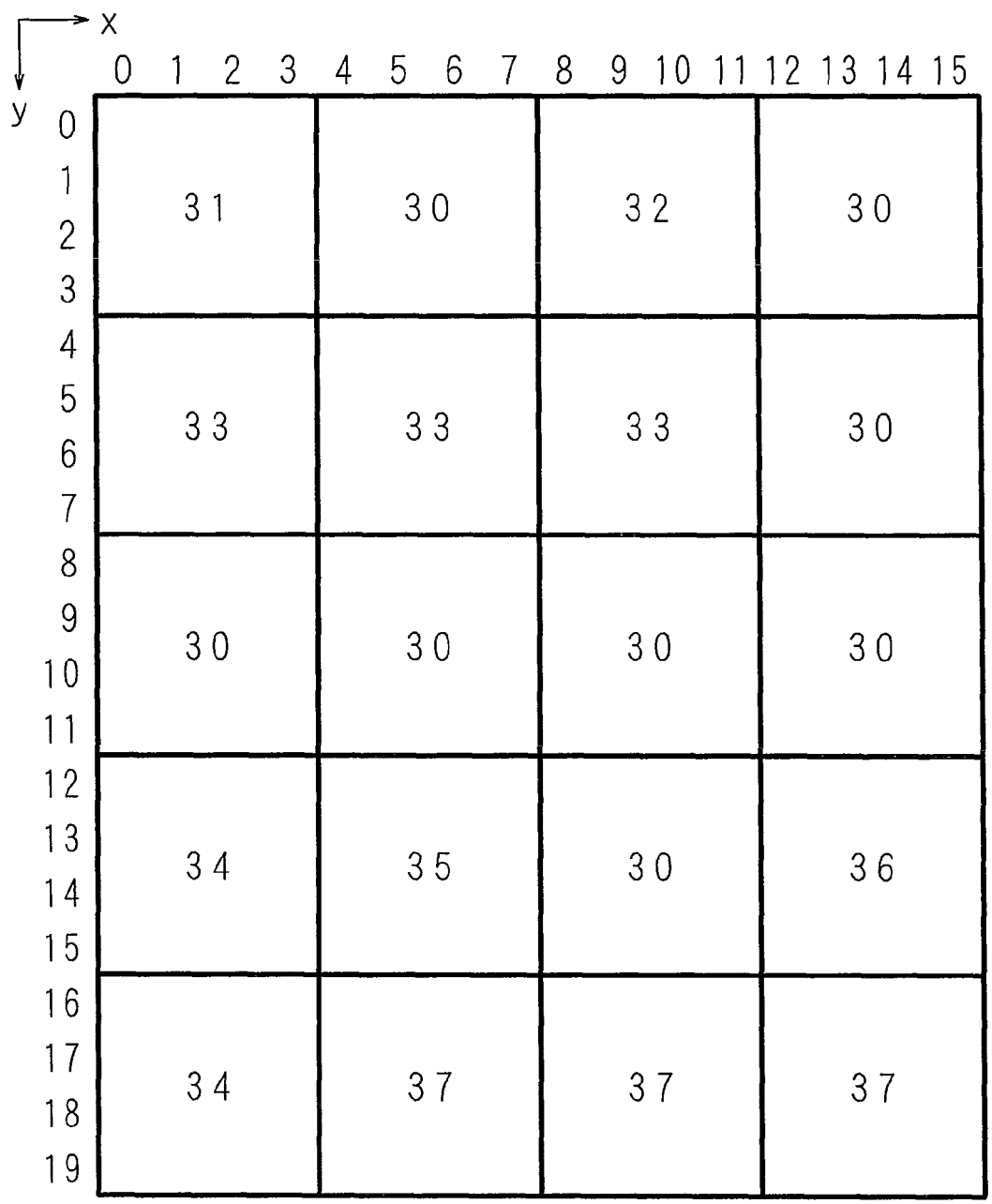
FIG. 12 is a schematic diagram illustrating tile identifiers assigned to individual tiles illustrated in FIG. 11.

FIG. 12 is a schematic diagram illustrating tile identifiers assigned to respective tiles of the binary image 5 illustrated in FIG. 11. Tile identifiers "30" to "37" illustrated in FIG. 12 are assigned to respective tiles of the binary image 5 with the execution of the tile mergence process by the binary image processing unit 34 in S20 illustrated in FIG. 9. In the binary image 5 illustrated in FIG. 12, the depiction of individual pixels is omitted. As seen from a comparison between the binary image 5 illustrated in FIG. 11 and the binary image 5 illustrated in FIG. 12, the tile identifier "30" is assigned to background tiles, while the tile identifiers "31" to "37" are respectively assigned to foreground tiles.

FIG. 13 is a schematic diagram illustrating a tile setting table related to tiles of the binary image 5 illustrated in FIG. 11 that are assigned with the tile identifiers illustrated in FIG. 12. In the tile setting table, a tile identifier and coordinate values indicative of the position and the range of a foreground tile or a background tile that is assigned with the tile identifier are stored in association with each other. This tile setting table is generated in the procedure of S14. Note that, at the point when the procedure of S14 is executed, only coordinate values related to tiles are stored in the tile setting table, and meaningless values are stored as tile identifiers. The tile identifiers are stored in the tile setting table with the execution of the tile mergence process by the binary image processing unit 34 in S20 illustrated in FIG. 9.

In the present embodiment, it is assumed that the tile setting table is generated in one-to-one correspondence to the binary image. In other words, N tile setting tables, in which N is equal to N as the number of kinds of foreground identifiers, are generated. Note that one tile setting table may be generated for N binary images when tile identifiers related to different foreground identifiers can be distinguished from each other.

The binary image processing unit 34 assigns the same tile identifier to foreground tiles determined to be merged, and assigns different tile identifiers to foreground tiles determined not to be merged. As a result, tiles, which are obtained by merging foreground tiles determined to be merged, and leaving foreground tiles determined not to be merged as they are, are set. Therefore, it is easy to find whether or not foreground tiles are merged by referring to tile setting tables.

After completing the procedure of S20 illustrated in FIG. 9, the binary image processing unit 34 determines whether or not the variable i is not less than the number N of kinds of foreground identifiers (S21). When i<N is satisfied (NO in S21), the binary image processing unit 34 increments the variable i by "1" (S22), and returns the processing to S20. By repeating the procedures of S20 to S22, foreground tiles set in each of N binary images are merged. When i≧N is satisfied (YES in S21), foreground tiles set in each of N binary images have been merged, and hence the binary image processing unit 34 terminates the binary image division and mergence process.

Figure 14:
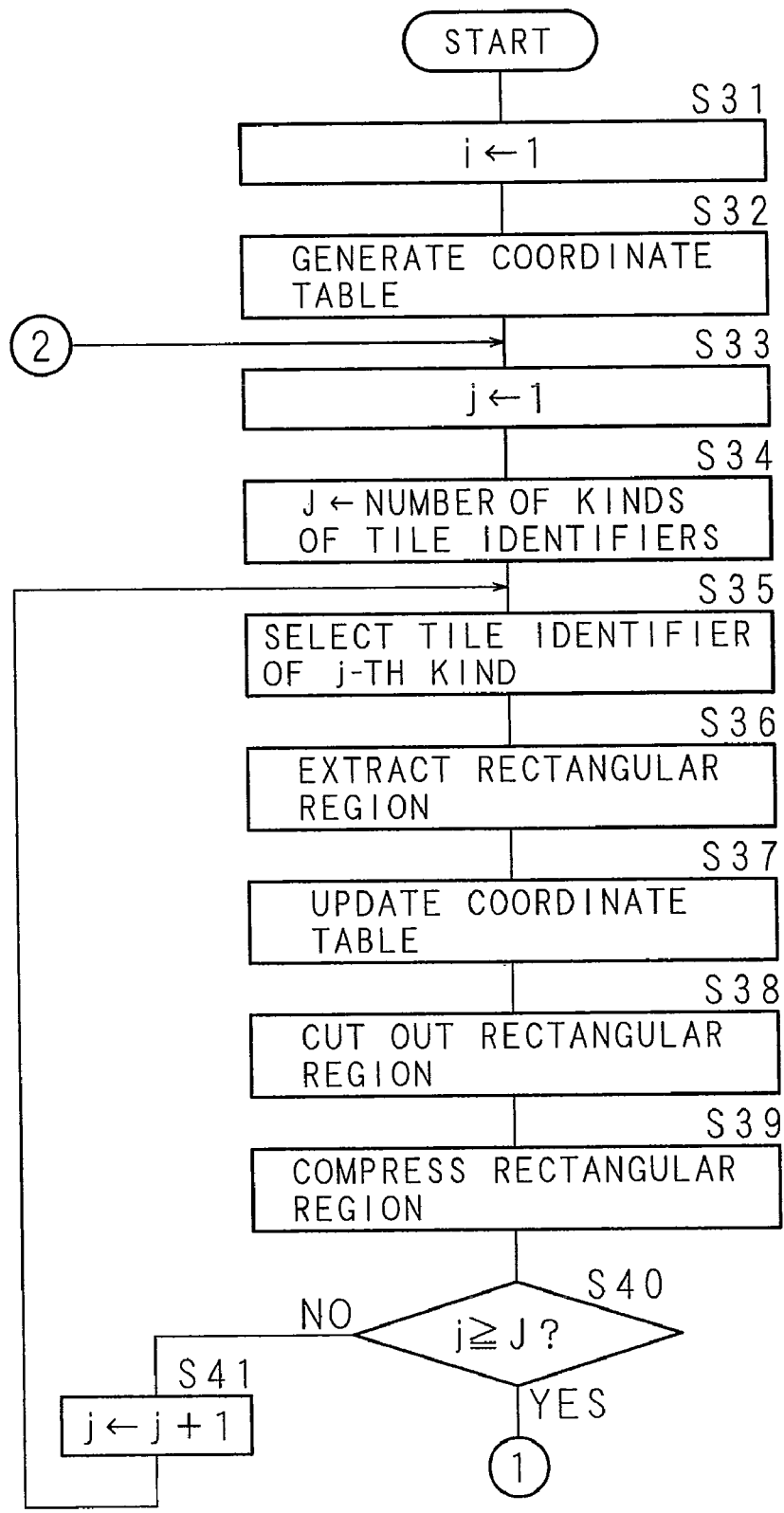
FIG. 14 is a flowchart illustrating procedures in a compressed image generation process executed in the compression process section included in the image forming apparatus according to Embodiment 1 of the present invention.
Figure 15:
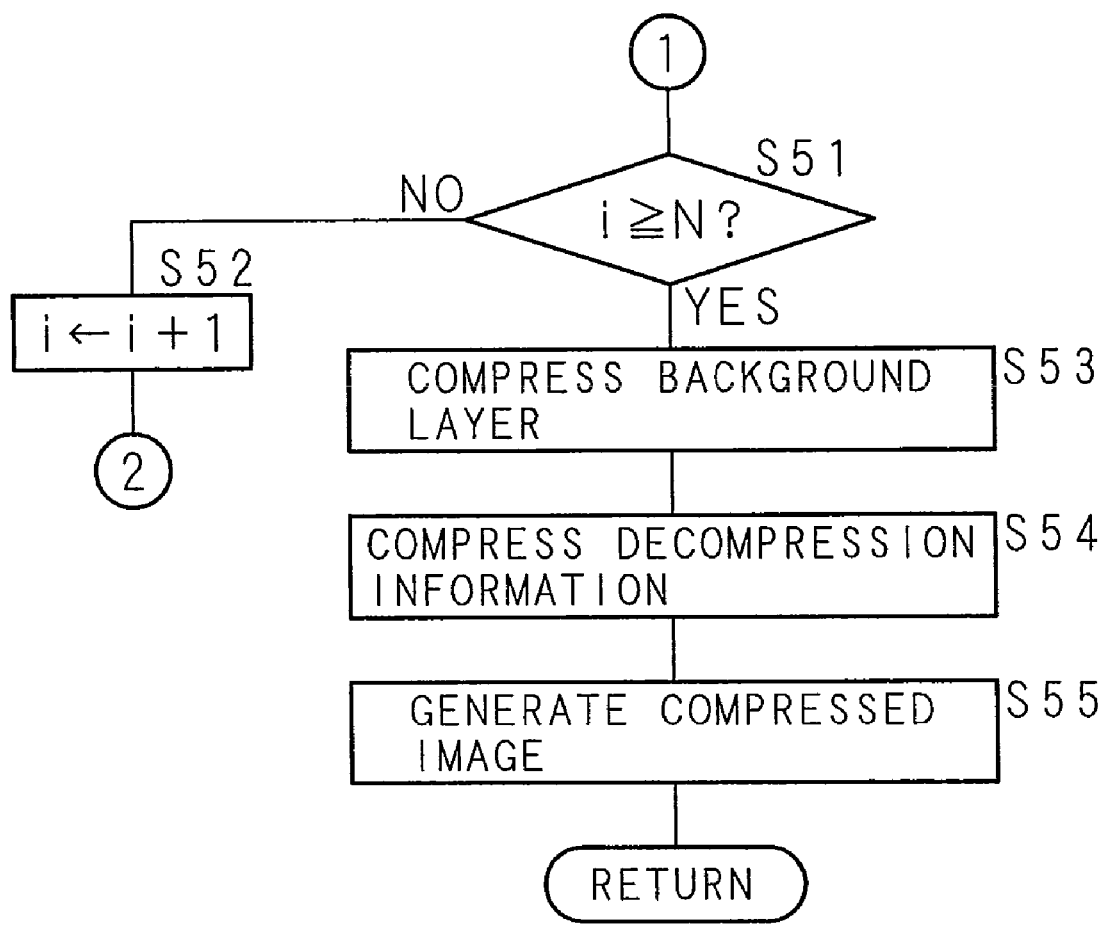
FIG. 15 is a flowchart illustrating procedures in the compressed image generation process executed in the compression process section included in the image forming apparatus according to Embodiment 1 of the present invention.

FIGS. 14 and 15 are flowcharts illustrating procedures in a compressed image generation process executed by the image compressing unit 35. The image compressing unit 35 sets the variable i to the initial value of "1" (S31). Subsequently, the image compressing unit 35 generates a coordinate table illustrated in FIG. 16 that will be described later (S32). Note that meaningless values are stored in the coordinate table at the stage of S32.

Then the image compressing unit 35 sets a variable j to the initial value of "1" (S33). Further, the image compressing unit 35 refers to a tile setting table related to the foreground identifier "i" to set a variable J to the number of kinds of tile identifiers assigned to foreground tiles (S34). In the tile setting table illustrated in FIG. 13, as can be seen by referring to the binary image 5 illustrated in FIG. 12, the variable J is set to "7".

Further, the image compressing unit 35 refers to the tile setting table related to the foreground identifier "i" to select a tile identifier of the j-th kind among tile identifiers assigned to foreground tiles (S35). Subsequently, the image compressing unit 35 extracts a rectangular region with the smallest area that includes all specific-pixel corresponding pixels included in the foreground tiles assigned with the tile identifier selected in S35 (S36).

Then the image compressing unit 35 updates the coordinate table (S37). The image compressing unit 35 in S37 issues a region identifier in correspondence to the tile identifier of the j-th kind, and causes the coordinate table to store the issued region identifier and coordinate values indicative of the position and the range of the rectangular region extracted in S36 in association with each other. FIG. 16 is a schematic diagram illustrating a coordinate table related to rectangular regions cut out from the binary image 5 illustrated in FIG. 10.

For example, as illustrated in FIG. 13, a foreground tile assigned with a tile identifier of the first kind "31", namely, one tile at coordinates (x, y)=(0, 0) is a foreground tile that has not been merged with other tiles. The image compressing unit 35 in S36 extracts one rectangular region in a range of coordinates (x, y)=(2, 2) to (2, 3) from the foreground tile (4×4 block) assigned with the tile identifier "31". The image compressing unit 35 in S37 issues a region identifier "K31" in correspondence to the tile identifier "31", and causes the coordinate table to store the issued region identifier "K31", and the minimum x coordinate value $x_{min}$=2, the maximum x coordinate value $x_{max}$=2, the minimum y coordinate value $y_{min}$=2, and the maximum y coordinate value $y_{max}$=3 in association with each other.

In addition, foreground tiles assigned with a tile identifier of the third kind "33", namely, three tiles at coordinates (x, y)=(0, 4), (4, 4), (8, 4) are merged foreground tiles. The image compressing unit 35 in S36 extracts one rectangular region in a range of coordinates (x, y)=(2, 4) to (11, 7) from foreground tiles (12×4 block) assigned with the tile identifier "33". The image compressing unit 35 in S37 issues a region identifier "K33" in correspondence to the tile identifier "33", and causes the coordinate table to store the issued region identifier "K33", and the minimum x coordinate value $x_{min}$=2, the maximum x coordinate value $x_{max}$=11, the minimum y coordinate value $y_{min}$=4, and the maximum y coordinate value $y_{max}$=7 in association with each other.

After completing the procedure of S37 illustrated in FIG. 14, the image compressing unit 35 cuts out the rectangular regions extracted in S36 from the binary image (S38). Note that it is necessary to associate the cut-out rectangular regions with the region identifiers in S38. Therefore, the image compressing unit 35 assigns, e.g., headers including the region identifiers to the cut-out rectangular regions.

FIG. 17 is a schematic diagram illustrating rectangular regions to be cut out from the binary image 5 illustrated in FIG. 10. The image compressing unit 35 in S38 illustrated in FIG. 14 cuts out any one of the rectangular regions K31 to K37 from foreground tiles assigned with any one of the tile identifiers "31" to "37", as illustrated in FIGS. 12 and 17.

Specifically, when j=1 is satisfied, the image compressing unit 35 cuts out the rectangular region K31 from one foreground tile assigned with the tile identifier "31" (the foreground tile that has not been merged). Further, when j=3 is satisfied, the image compressing unit 35 in S38 cuts out the rectangular region K33 from three foreground tiles assigned with the tile identifier "33" (the merged foreground tiles).

After completing the procedure of S38 illustrated in FIG. 14, the image compressing unit 35 performs lossless compression on the rectangular regions cut out in S38 (S39). Subsequently, the image compressing unit 35 determines whether or not the variable j is not less than the variable J (S40). When j<J is satisfied (NO in S40), the image compressing unit 35 increments the variable j by "1" (S41), and returns the processing to S35. By repeating the procedures of S35 to S41, the cutting out and compression of J rectangular regions are executed.

When j≧J is satisfied (YES in S40), the cutting out and compression of J rectangular regions have been executed, and hence the image compressing unit 35 determines whether or not the variable i is not less than the number N of kinds of foreground identifiers (S51), as illustrated in FIG. 15. When i<N is satisfied (NO in S51), the image compressing unit 35 increments the variable i by "1" (S52), and returns the processing to S33 (see FIG. 14). By repeating the procedures of S33 to S52, the cutting out and compression of the rectangular regions in each of N binary images are executed. When i≧N is satisfied (YES in S51), the cutting out and compression of the rectangular regions in each of N binary images have been executed, and hence the image compressing unit 35 performs lossy compression on the background layer (S53).

Further, the image compressing unit 35 performs lossless compression on decompression information including the IC table and the coordinate table (S54). Subsequently, the image compressing unit 35 puts together the rectangular regions, the background layer, and the decompression information that have been compressed in one file to thereby generate a compressed image (S55), and terminates the compressed image generation process.

Figure 18:
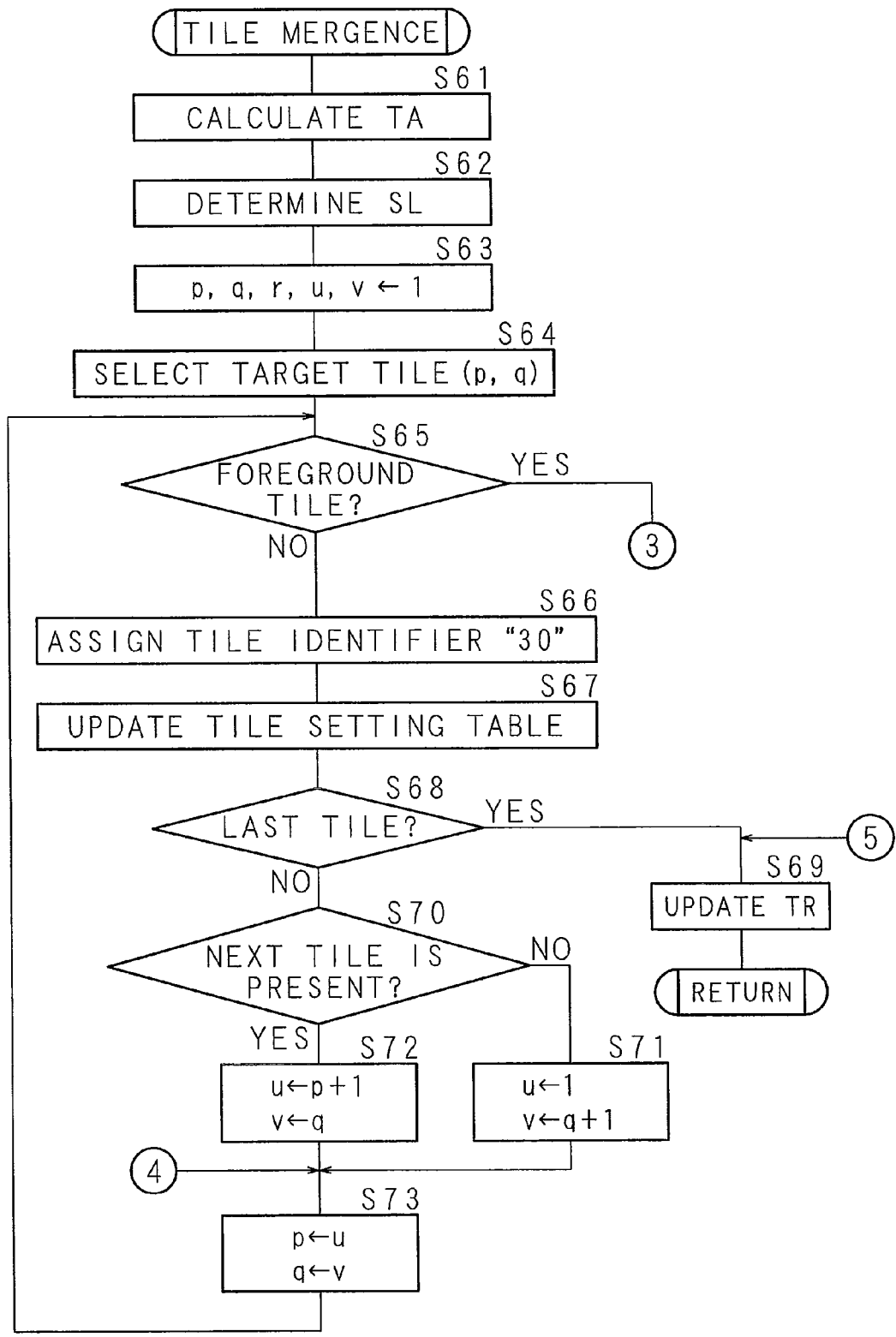
FIG. 18 is a flowchart illustrating procedures in a subroutine of a tile mergence process executed in an image compressing apparatus according to Embodiment 1 of the present invention.

FIGS. 18 to 21 are flowcharts illustrating procedures in a subroutine of the tile mergence process executed by the binary image processing unit 34. As illustrated in FIG. 18, the binary image processing unit 34 firstly calculates a number TA of allocated tiles related to a specific identifier "i" (S61). The number TA of allocated tiles denotes an upper limit value of the number of kinds of tile identifiers assigned to foreground tiles related to the specific identifier "i". The number TA of allocated tiles is calculated by using the number TR of remaining tiles, the total number TC of foreground tiles, a number FC of foreground tiles related to the specific identifier "i", and the following expression (5).

$$TA=FC\times TR/TC \quad (5)$$

Note that the binary image processing unit 34 omits fractions of the result of calculation of the expression (5) in principle, and rounds up the result only when the result of calculation of the expression (5) is less than "1". Accordingly, it follows that the number TA of allocated tiles is a natural number that satisfies TA≦TR. After completing the procedure of S61, the binary image processing unit 34 determines a threshold value SL (S62). Because of this, in the present embodiment, the binary image processing unit 34 is provided in advance with three kinds of threshold values ranged from the minimum value to the maximum value of SL_S, SL_M, and SL_L.

The binary image processing unit 34 in S62 determines the threshold value SL in accordance with the result of comparison between the number FC of foreground tiles and the number TA of allocated tiles calculated in S61. Specifically, when FC≦TA is satisfied, the binary image processing unit 34 determines the minimum threshold value SL_S as the threshold value SL. This is because the number FC of foreground tiles is smaller than the number TA of allocated tiles so that it is not necessary to take the trouble to merge foreground tiles. On the other hand, when FC>TA is satisfied, the binary image processing unit 34 determines the medium threshold value SL_M as the threshold value SL in order to increase the possibility that foreground tiles are allowed to be merged. The binary image processing unit 34 in S62 functions as the prejudgment determining unit in the embodiment of the present invention.

In the binary image 5 illustrated in FIG. 11, it is assumed that the threshold values SL_S, SL_M, SL_L=3, 5, 6, and the number TA of allocated tiles=7 are established. Since the number FC of foreground tiles=12 holds, the threshold value SL=5 is satisfied.

After completing the procedure of S62, the binary image processing unit 34 sets each of variables p, q, r, u, and v to the initial value of "1" (S63). The binary image processing unit 34 selects a tile at the p-th position in the main scanning direction and the q-th position in the subscanning direction as a target tile (p, q) (S64), and determines whether or not the target tile (p, q) is a foreground tile (S65).

When the target tile (p, q) is a background tile (NO in S65), the binary image processing unit 34 assigns a tile identifier "30", namely, a tile identifier to be assigned to a background tile to the target tile (p, q) (S66), and updates the tile setting table (S67). That is, in the procedures of S65 to S67, the binary image processing unit 34 determines that adjacent tiles including the target tile (p, are not merged, and sets such tiles. For example, in the binary image 5 illustrated in FIG. 11, a target tile (2, 1), namely, a tile at coordinates (x, y)=(4, 0) is a background tile. Consequently, as illustrated in FIGS. 12 and 13, the target tile (2, 1) is assigned with the tile identifier "30".

After completing the procedure of S67, the binary image processing unit 34 determines whether or not the target tile (p, q) is the last tile (S68). In the case where the number of tiles in the main scanning direction is P, and the number of tiles in the subscanning direction is Q, when p=P, and q=Q are satisfied, the target tile (p, q) is the last tile.

When the target tile (p, q) is the last tile (YES in S68), the binary image processing unit 34 updates the number TR of remaining tiles (S69). In this case, the number TR of remaining tiles is calculated by using the variable r and the following expression (6). This is because the number of kinds r is, in other words, the number of kinds of tile identifiers assigned to foreground tiles related to the specific identifier "i".

$$TR=TR-r \quad (6)$$

After completing the procedure of S69, the binary image processing unit 34 terminates the tile mergence process, and returns the processing to the original routine.

When the target tile (p, q) is not the last tile (NO in S68), the binary image processing unit 34 determines whether or not a tile next to the target tile (p, q) in the main scanning direction is present (S70). When p=P is satisfied, the tile next to the target tile (p, q) in the main scanning direction (hereinafter simply referred to as a next tile) is not present. When the next tile to the target tile (p, q) is not present (NO in S70), the binary image processing unit 34 sets the variable u to the initial value of "1", and sets the variable v to the variable q+1 (S71). When the next tile to the target tile (p, q) is present (YES in S70), the binary image processing unit 34 sets the variable u to the variable p+1, and sets the variable v to the variable q (S72).

After completing the procedure of S71 or S72, the binary image processing unit 34 sets the variable p to the variable u, and sets the variable q to the variable v (S73), and returns the processing to S65. When the target tile (p, q) is a foreground tile (YES in S65), the binary image processing unit 34 determines whether or not a tile (p−1, q) at the {p−1}-th position in the main scanning direction and the q-th position in the subscanning direction is a foreground tile (S81).

When the tile (p−1, q) is a background tile, or when the tile (p−1, q) is not present because the variable p=1 holds (NO in S81), the binary image processing unit 34 assigns a tile identifier of the r-th kind to the target tile (p, q) (S82), and updates the tile setting table (S83). In other words, in the procedures of S81 to S83, the binary image processing unit 34 determines that adjacent tiles including the target tile (p, q) are not merged, and sets such tiles.

For example, in the binary image 5 illustrated in FIG. 11, for a target tile (1, 1), namely, a tile at coordinates (x, y)=(0, 0), the tile (p−1, q) is not present and, for a target tile (3, 1), namely, a tile at coordinates (x, y)=(8, 0), the tile (p−1, q) is a background tile. Accordingly, as illustrated in FIGS. 12 and 13, the target tile (1, 1) is assigned with the tile identifier of the first kind "31", and the target tile (3, 1) is assigned with the tile identifier of the second kind "32".

After completing the procedure of S83, the binary image processing unit 34 determines whether or not the target tile (p, q) is the last tile in the same manner as in the procedure of S68 (S84). When the target tile (p, q) is the last tile (YES in S84), the binary image processing unit 34 calls a subroutine for performing a vertical mergence process (see FIGS. 22 and 23) described later, and executes the process (S85). In the vertical mergence process, it is determined whether or not tiles adjacent in the subscanning direction are to be merged. After completing the procedure of S85, the binary image processing unit 34 moves the processing to S69 (see FIG. 18).

When the target tile (p, q) is not the last tile (NO in S84), the binary image processing unit 34 determines whether or not the next tile to the target tile (p, q) is present in the same manner as in the procedure of S70 (S86). When the next tile to the target tile (p, q) is not present (NO in S86), the binary image processing unit 34 sets the variable u to the initial value of "1", and sets the variable v to the variable q+1 (S87), and then calls the subroutine for performing the vertical mergence (see FIGS. 22 and 23), and executes the process (S88).

After completing the procedure of S88, the binary image processing unit 34 determines whether or not the variable r is not less than the number TA of allocated tiles (S89). When r<TA is satisfied (NO in S89), the binary image processing unit 34 increments the variable r by "1" (S90). Subsequently, the binary image processing unit 34 determines the threshold value SL (S91). The binary image processing unit 34 in S91 determines the threshold value SL in accordance with the result of comparison between the variable r, namely, the number r of kinds of tile identifiers issued until this point in time, and a value corresponding to 50% of the number TA of allocated tiles calculated in S61.

Specifically, when r≦TA×0.5 is satisfied, the binary image processing unit 34 determines that the present threshold value SL is continuously used as the next threshold value SL. On the other hand, when r>TA×0.5 is satisfied, the binary image processing unit 34 determines that the maximum threshold value SL_L is used as the next threshold value SL. The binary image processing unit 34 in S91 functions as the on-judgment determining unit in the embodiment of the present invention. In the example of the binary image 5 illustrated in FIG. 11, when r=1 to 3 is established, the threshold value SL=5 is satisfied, while when r=4 to 7 is established, the threshold value SL=6 is satisfied.

After completing the procedure of S91, the binary image processing unit 34 returns the processing to S73 (see FIG. 18). Note that, when the number FC of foreground tiles related to the specific identifier "i" is not more than the number TA of allocated tiles, the binary image processing unit 34 may omit the procedure of S91.

When the next tile to the target tile (p, q) is present (YES in S86), the binary image processing unit 34 determines whether or not a tile (p+1, q) is a background tile (S92). When the tile (p+1, q) is a background tile (YES in S92), the binary image processing unit 34 sets the variable u to the variable p+1 and sets the variable v to the variable q (S93), and returns the processing to S88. When the tile (p+1, q) is a foreground tile (NO in S92), the binary image processing unit 34 sets the variable p to the variable p+1 (S94), and moves the processing to S100 described later (see FIG. 20).

Figure 20:
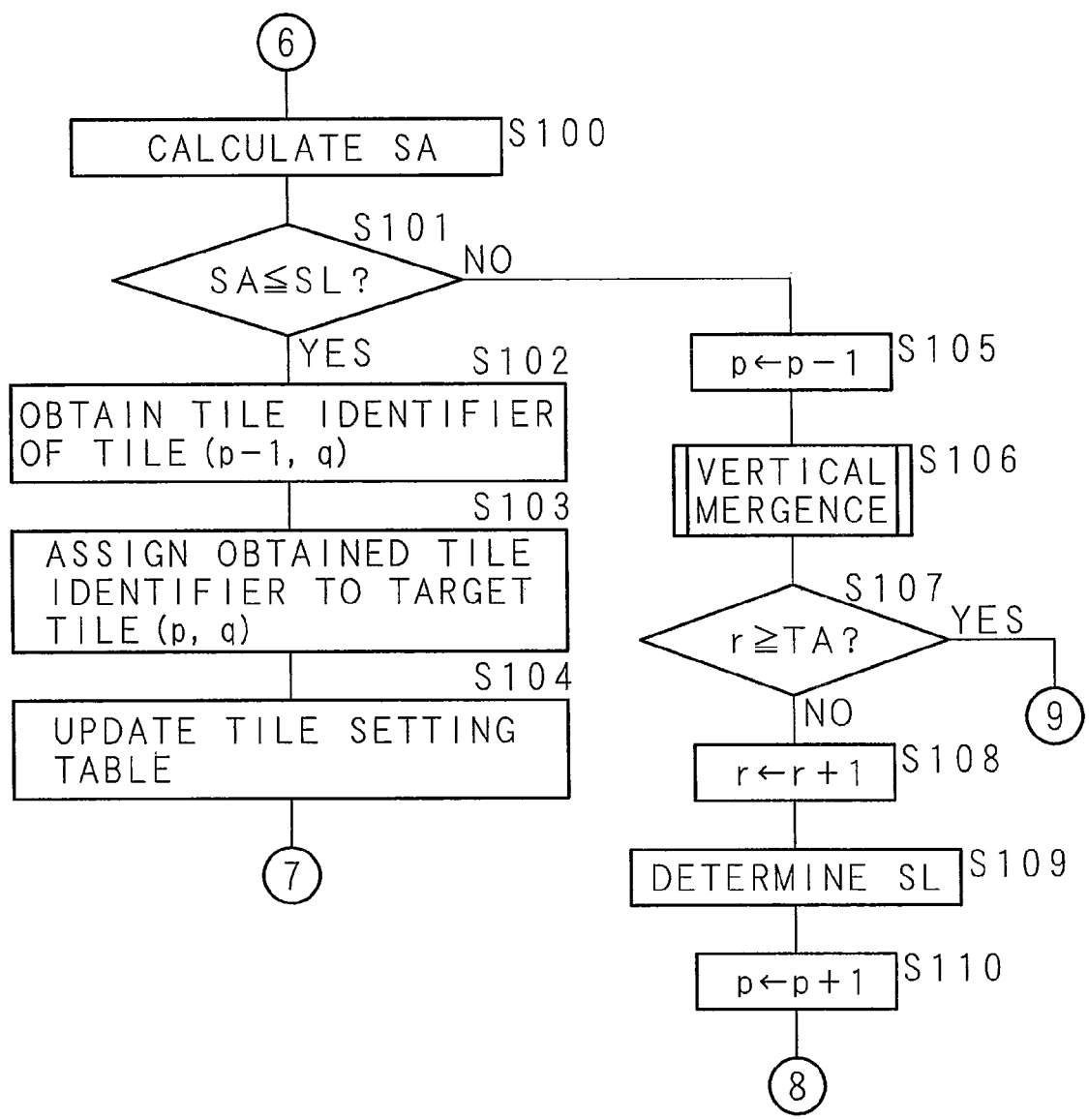
FIG. 20 is a flowchart illustrating procedures in the subroutine of the tile mergence process executed in the image compressing apparatus according to Embodiment 1 of the present invention.
Figure 21:
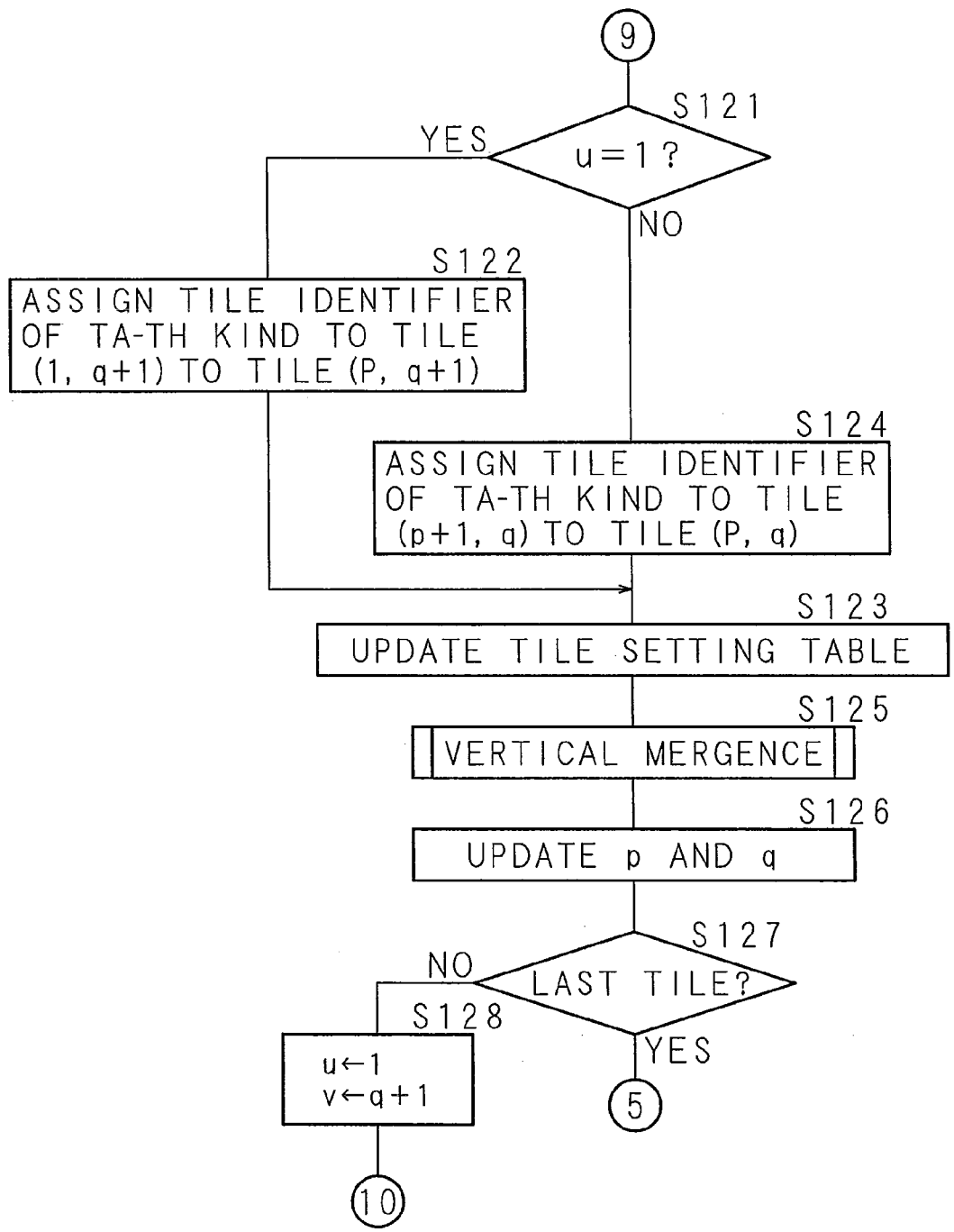
FIG. 21 is a flowchart illustrating procedures in the subroutine of the tile mergence process executed in the image compressing apparatus according to Embodiment 1 of the present invention.

When the tile (p−1, q) is a foreground tile (YES in S81), as illustrated in FIG. 20, the binary image processing unit 34 calculates an increased area SA of a rectangular region (S100). At this point, the increased area SA of a rectangular region is an area obtained by subtracting the sum of an area S2 of a rectangular region A2 cut out from the target tile (p, q) and an area S3 of a rectangular region A3 cut out from the tile (p−1, q) when the target tile (p, q) and the tile (p−1, q) are not merged from an area S1 of a rectangular region A1 cut out from tiles obtained by merging the target tile (p, q) and the tile (p−1, q) when the target tile (p, q) and the tile (p−1, q) are merged.

In the following description, it is assumed that coordinate values indicative of the position and the range of the rectangular region A2 cut out from the target tile (p, q) are a minimum x coordinate value $x_{2min}$, a maximum x coordinate value $x_{2max}$, a minimum y coordinate value $y_{2min}$, and a maximum y coordinate value $y_{2max}$. In addition, it is assumed that coordinate values indicative of the position and the range of the rectangular region A3 cut out from the tile (p−1, q) are a minimum x coordinate value $x_{3min}$, a maximum x coordinate value $x_{3max}$, a minimum y coordinate value $y_{3min}$, and a maximum y coordinate value $y_{3max}$. In this case, the areas S1, S2, S3, and the increased area SA are calculated by employing the following expressions (7) to (10). Note that MAX [a, b] is a function for selecting a maximum value between arguments a and b, and MIN [a, b] is a function for selecting a minimum value between arguments a and b.

$$S1=\{MAX[x_{2max},x_{3max}]-MIN[x_{2min},x_{3min}]+1\}\times\{MAX[y_{2max},y_{3max}]-MIN[y_{2min},y_{3min}]+1\} \quad (7)$$

$$S2=\{x_{2max}-x_{2min}+1\}\times\{y_{2max}-y_{2min}+1\} \quad (8)$$

$$S3=\{x_{3max}-x_{3min}+1\}\times\{y_{3max}-y_{3min}+1\} \quad (9)$$

$$SA=S1-\{S2+S3\} \quad (10)$$

Note that the binary image processing unit 34 in S100 may determine the areas S1, S2, and S3 by counting the number of pixels included in the rectangular regions A1, A2, and A3.

After completing the procedure of S100, the binary image processing unit 34 determines whether or not the increased area SA is not more than the threshold value SL (S101). When SA≦SL is satisfied (YES in S101), it can be seen that the number of specific-pixel non-corresponding pixels included in the rectangular region A1 is small. Therefore, the binary image processing unit 34 refers to the tile setting table to obtain the tile identifier assigned to the tile (p−1,q) (S102), assigns the obtained tile identifier to the target tile (p, q) (S103), and updates the tile setting table (S104). In other words, in the procedures of S101 to S104, the binary image processing unit 34 determines that the target tile (p, q) and the tile (p−1, q) are merged, and sets merged tiles.

For example, in the binary image 5 illustrated in FIG. 11, in the case of a target tile (2, 2), namely, a tile at coordinates (x, y)=(4, 4), and a tile (1, 2), namely, a tile at coordinates (x, y)=(0, 4), the areas S1, S2, S3=24, 16, 6, and the increased area SA=2 are satisfied. Since the threshold value SL=5 is established, SA≦SL is satisfied. Accordingly, as illustrated in FIGS. 12 and 13, the target tile (2, 2) is assigned with the tile identifier "33" that is the same as that assigned to the tile (1, 2).

Figure 19:
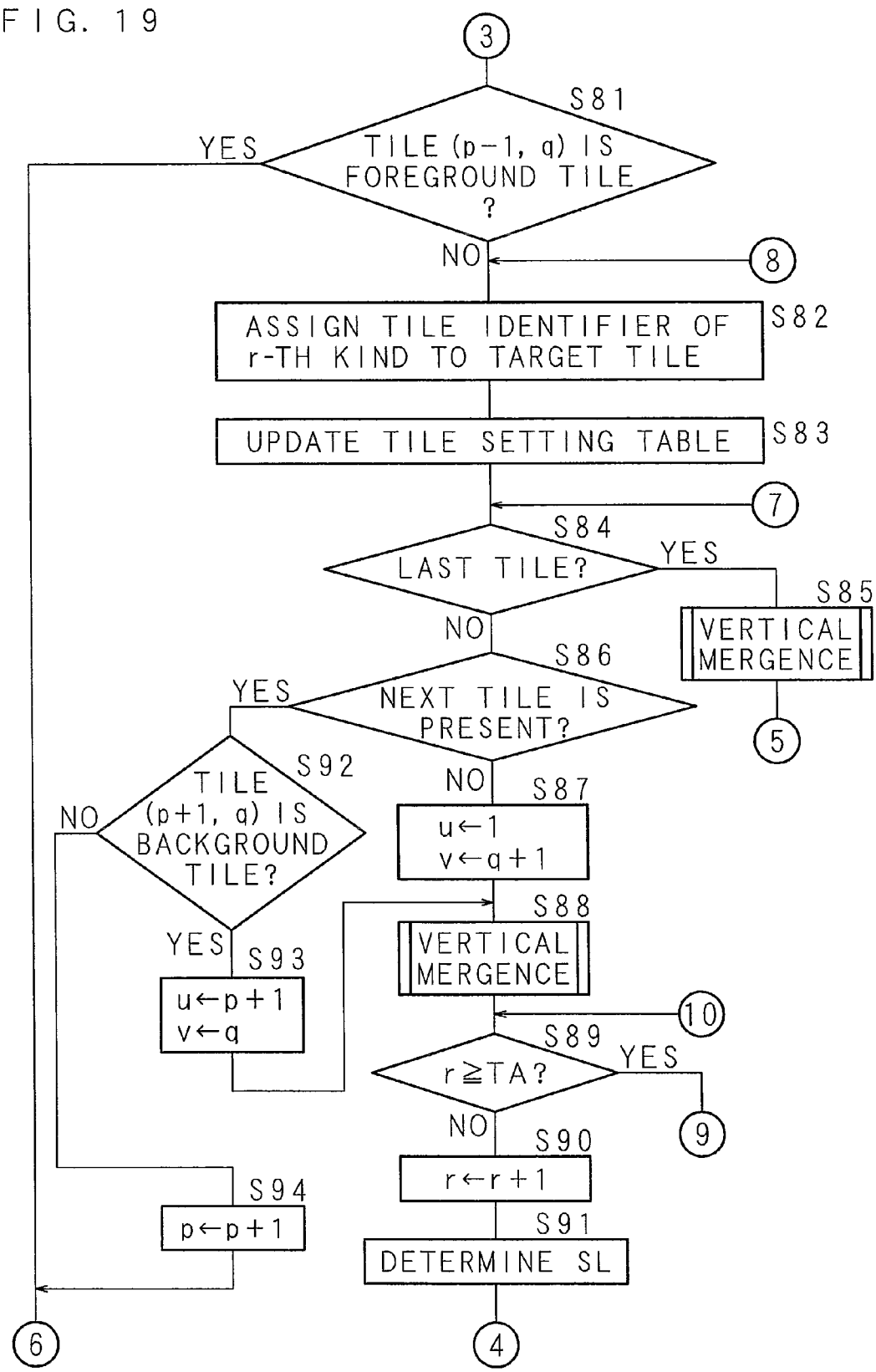
FIG. 19 is a flowchart illustrating procedures in the subroutine of the tile mergence process executed in the image compressing apparatus according to Embodiment 1 of the present invention.

After completing the procedure of S104, the binary image processing unit 34 moves the processing to S84 (see FIG. 19). As illustrated in FIG. 20, when SA>SL is satisfied (NO in S101), it can be seen that the number of specific-pixel non-corresponding pixels included in the rectangular region A1 is large. Therefore, the binary image processing unit 34 decrements the variable p by "1" (S105), and calls the subroutine for performing the vertical mergence process (see FIGS. 22 and 23), and executes the process (S106). After completing the procedure of S106, the binary image processing unit 34 determines whether or not the variable r is not less than the number TA of allocated tiles (S107).

When r<TA is satisfied (NO in S107), the binary image processing unit 34 increments the variable r by "1" (S108), and determines the threshold value SL in the same manner as in the procedure of S91 (S109). Then the binary image processing unit 34 sets the variable p to the variable p+1 (S110), and moves the processing to S82 (see FIG. 19). That is, the judgment of NO in S101 means that the binary image processing unit 34 has determined that the target tile (p, q) and the tile (p−1, q) are not merged. Thereafter, by executing the procedures of S82 and S83, the binary image processing unit 34 sets such tiles.

For example, in the binary image 5 illustrated in FIG. 11, in the case of a target tile (2, 4), namely, a tile at coordinates (x, y)=(4, 12), and a tile (1, 4), namely, a tile at coordinates (x, y)=(0, 12), the areas S1, S2, S3=21, 9, 4 and the increased area SA=8 are satisfied. Since the threshold value SL=6 is established, SA>SL is satisfied. Therefore, as illustrated in FIG. 12, the target tile (2, 4) is assigned with the tile identifier "35" instead of the tile identifier "34" that is assigned to the tile (1, 4).

As illustrated in FIG. 19, when r≧TA is satisfied (YES in S89), or as illustrated in FIG. 20, when r≧TA is satisfied (YES in S107), the binary image processing unit 34 etermines whether or not the variable u is set to "1" (S121). When u=1 is satisfied (YES in S121), the next tile to the target tile (p, q) in the main scanning direction is not present. Consequently, the binary image processing unit 34 assigns a tile identifier of the TA-th kind to all tiles from a tile (1, q+1) to a tile (P, q+1) (S122), and updates the tile setting table (S123). When u≠1 is satisfied (NO in S121), the next tile to the target tile (p, q) in the main scanning direction is present. Consequently, the binary image processing unit 34 assigns the tile identifier of the TA-th kind to all tiles from a tile (p+1, q) to a tile (P, q) (S124), moves the processing to S123, and updates the tile setting table.

In other words, in the procedures of S89 to S123, the binary image processing unit 34 determines that the target tile (p, q) and all tiles subsequent to the target tile (p, q) are merged, and sets such foreground tiles. When the target tile (p, q) and all tiles subsequent to the target tile (p, q) are not merged, there arises an inconvenience that the number r of of kinds of tile identifiers that are assigned to foreground tiles related to the specific identifier "i" exceeds the number TA of allocated tiles as the upper limit value.

For example, in the binary image 5 illustrated in FIG. 11, a target tile (2, 5), namely, a tile at coordinates (x, y)=(4, 16) is assigned with a tile identifier "37". The tile identifier "37" is a tile identifier of the 7th kind. Consequently, r=7, and r≧TA are satisfied.

In the example of the binary image 5 illustrated in FIG. 11, a tile (2, 5) and a tile (3, 5), and the tile (3, 5) and a tile (4, 5) are tiles to be determined to be merged even when a usual mergence judgment process is executed. However, even when they are tiles that are determined not to be merged as a result of execution of the usual mergence judgment process, the tile (3, 5) and the tile (4, 5) are assigned with the tile identifier "37" that is the same as that assigned to the tile (2, 5). This is because a tile identifier of the 8-th kind "38" can not be assigned to the tile (3, 5) or the tile (4, 5) due to the restriction by the number TA of allocated tiles.

After completing the procedure of S123, the binary image processing unit 34 calls the subroutine for performing the vertical mergence process (see FIGS. 22 and 23), and executes the process (S125). As a result, when a procedure of S136 described later is executed, the number r of kinds becomes smaller than the number TA of allocated tiles. After completing the procedure of S125, the binary image processing unit 34 updates the variables p and q (S126). The binary image processing unit 34 in S126 sets the variable p to the number P of tiles in the main scanning direction. In addition, the binary image processing unit 34 in S126 sets the variable q to the variable q+1 when u=1 is satisfied (i.e., when S122 is executed), and leaves the variable q unchanged when u≠1 is satisfied (i.e., when S124 is executed).

Subsequently, the binary image processing unit 34 determines whether or not the target tile (p, q) is the last tile (S127) in the same manner as in the procedure of S68. When the target tile (p, q) is the last tile (YES in S127), the binary image processing unit 34 moves the processing to S69 (see FIG. 18). When the target tile (p, q) is not the last tile (NO in S127), the binary image processing unit 34 sets the variable u to the initial value of "1" and sets the variable v to the variable q+1 (S128), and then returns the processing to S89 (see FIG. 19).

Thereafter, the judgment of YES is made in S89, the tile identifier of the TA-th kind is assigned to all tiles from the tile (1, q+1) to the tile (p, q+1). As a result, all of the tiles that are not assigned with a tile identifier yet are assigned with the same tile identifier as that assigned to the target tile (p, q).

In the tile mergence process described above, with the execution, of the procedures of S62 and S91, it is possible to cut out the optimum number, which is based on the ability of the image compressing apparatus, of rectangular regions in the optimum range suitable for the layout of the foreground included in the original image. This is because the layout of the foreground is reflected in the number FC of foreground tiles related to the specific identifier "i", the number TA of allocated tiles, and the number r of kinds of tile identifiers issued until this point in time. At this point, examples of features of the foreground include layouts such as the disposition of texts included in the original image, a distribution of text colors included therein, and the like.

Note that the binary image processing unit 34 may be provided in advance with two kinds of threshold values of the minimum and medium threshold values SL_S and SL_M. In this case, the binary image processing unit 34 executes the procedure of S62, but does not execute the procedure of S91. Alternatively, the binary image processing unit 34 may also be provided in advance with two kinds of threshold values of the minimum and maximum threshold values SL_S and SL_L. In this case, the binary image processing unit 34 determines the threshold value SL_M as the threshold value SL at all times in the procedure of S62, and executes the procedure of S91. Alternatively, the binary image processing unit 34 may also be provided in advance with the maximum threshold value SL_L. In this case, the binary image processing unit 34 determines the threshold value SL_L as the threshold value SL at all times in the procedure of S62, and does not execute the procedure of S91.

In addition, the binary image processing unit 34 may also determine the threshold value SL, SL_S, SL_M, or SL_L flexibly in accordance with the size of the binary image or the size of the foreground tile. For example, when the size of the binary image is 16×16, the binary image processing unit 34 determines that the minimum threshold value SL_S=16×16×0.2≈51, the medium threshold value SL_M=16×16×0.3≈77, and the maximum threshold value SL_L=16×16×0.4≈102 are satisfied. On the other hand, when the size of the foreground tile is 4×4, the binary image processing unit 34 determines that the minimum threshold value SL_S=4×4×0.2≈3, the medium threshold value SL_M=4×4×0.3≈5, and the maximum threshold value SL_L=4×4×0.4≈6 are satisfied.

Figure 22:
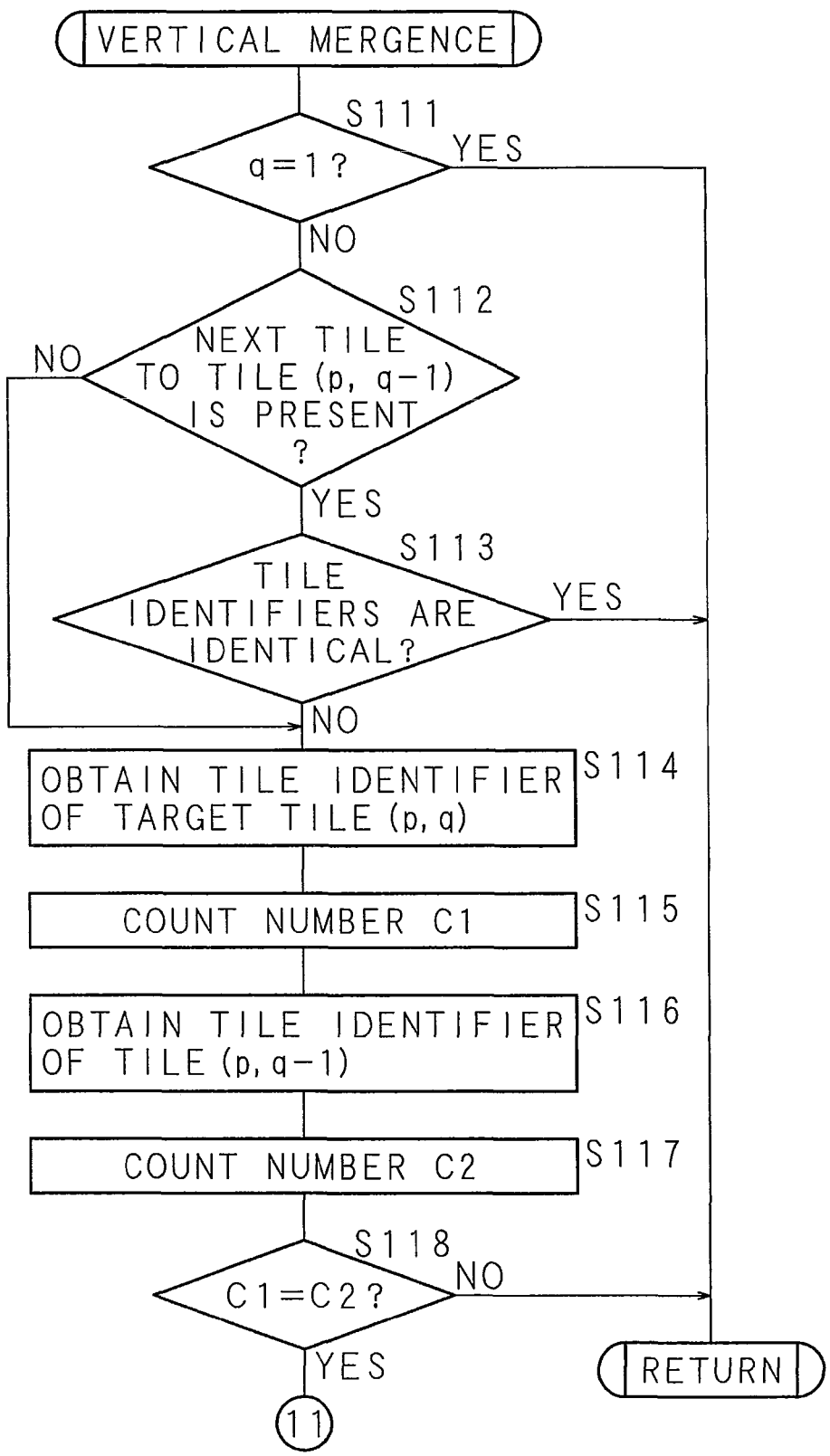
FIG. 22 is a flowchart illustrating procedures in a subroutine of a vertical mergence process executed in the image compressing apparatus according to Embodiment 1 of the present invention.
Figure 23:
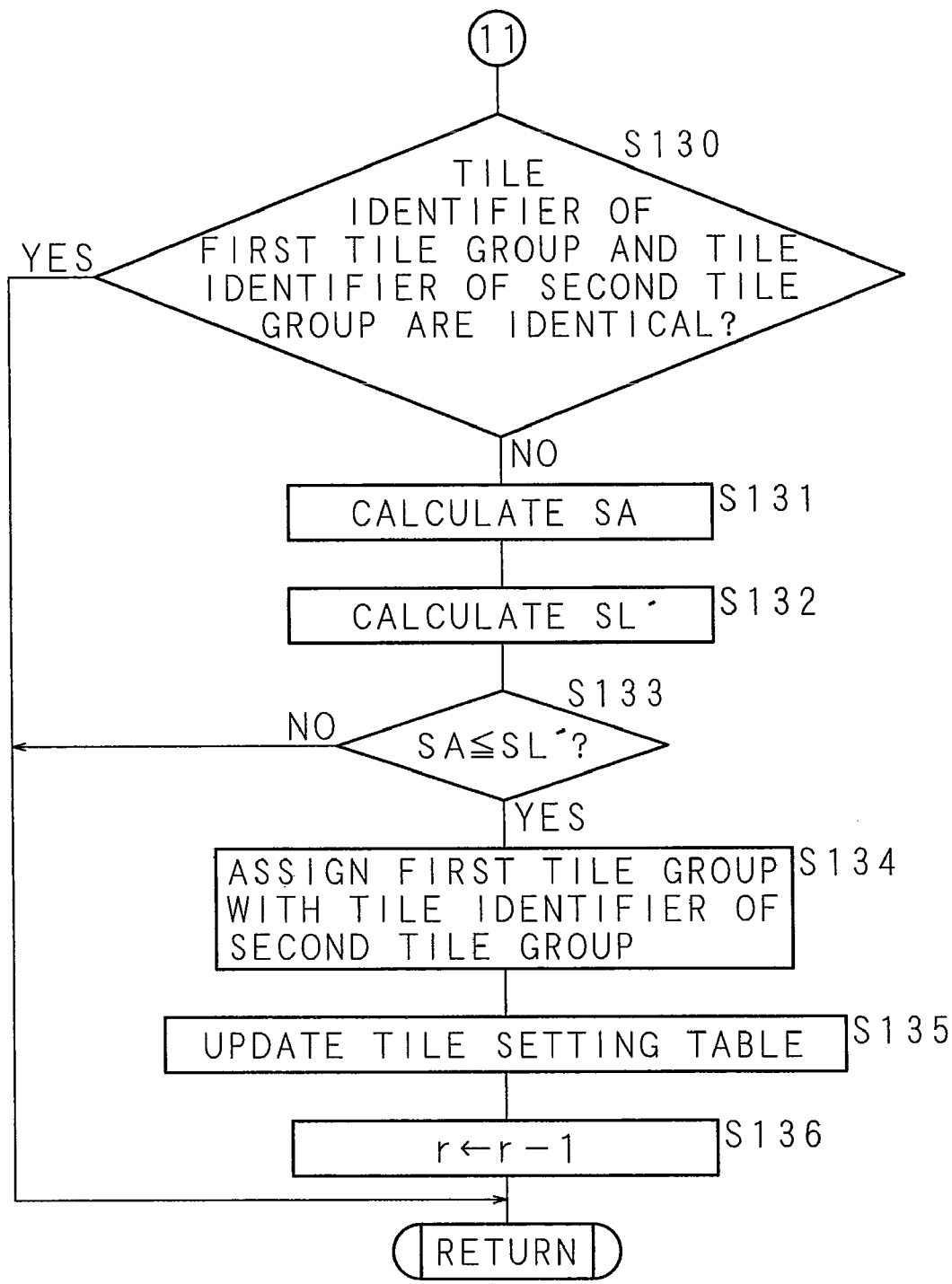
FIG. 23 is a flowchart illustrating procedures in the subroutine of the vertical mergence process executed in the image compressing apparatus according to Embodiment 1 of the present invention.

FIGS. 22 and 23 are flowcharts illustrating procedures in the subroutine of the vertical mergence process executed by the binary image processing unit 34. As illustrated in FIG. 22, the binary image processing unit 34 determines whether or not q=1 is satisfied (S111) and, when q=1 is satisfied (YES in S111), the binary image processing unit 34 terminates the vertical mergence process, and returns the processing to the original routine. When q>1 is satisfied (NO in S111), the binary image processing unit 34 determines whether or not the next tile to a tile (p, q−1) is present in the same manner as in the procedure of S70 (S112).

When the next tile to the tile (p, q−1) is present (YES in S112), the binary image processing unit 34 determines whether or not the tile identifier assigned to the tile (p, q−1) is identical with that assigned to a tile (p+1, q−1) (S113). When these tile identifiers are identical with each other (YES in S113), the binary image processing unit 34 terminates the vertical mergence process, and return the processing to the original routine. In other words, the binary image processing unit 34 determines that the target tile (p, q) and the tile (p, q−1) are not merged.

When these tile identifiers are not identical with each other (NO in S113), or when the next tile to the tile (p, q−1) is not present (NO in S112), the binary image processing unit 34 refers to the tile setting table to obtain the tile identifier assigned to the target tile (p, q) (S114). Then the binary image processing unit 34 counts a number C1 of tile identifiers obtained in S114 that are stored in the tile setting table (S115). The result of the count obtained at this time is equal to the number C1 of tiles assigned with the same tile identifier as that assigned to the target tile (p, q) (hereinafter referred to as the first tile group).

Subsequently, the binary image processing unit 34 refers to the tile setting table to obtain the tile identifier assigned to the tile (p, q−1) (S116), and counts a number C2 of obtained tile identifiers stored in the tile setting table (S117). The result of the count obtained at this time is equal to the number C2 of tiles assigned with the same tile identifier as that assigned to the target tile (p, q−1) (hereinafter referred to as the second tile group). Further, the binary image processing unit 34 determines whether or not the number C1 is equal to the number C2 (S118) and, when C1≠C2 is satisfied (NO in S118), the binary image processing unit 34 terminates the vertical mergence process, and returns the processing to the original routine. In other words, the binary image processing unit 34 determines that the first tile group and the second tile group are not merged.

When C1=C2 is satisfied (YES in S118), as illustrated in FIG. 23, the binary image processing unit 34 determines whether or not the tile identifier assigned to the first tile group and the tile identifier assigned to the second tile group are identical with each other (S130). When the tile identifiers assigned to the first and second tile groups are identical with each other (YES in S130), the binary image processing unit 34 terminates the vertical mergence process, and returns the processing to the original routine. This is because the tile identifier of the TA-th kind is assigned to these tiles.

When the tile identifiers of the first and second tile groups are different from each other (NO in S130), the binary image processing unit 34 calculates the increased area SA of the rectangular region in the same manner as in the procedure of S100 (S131). At this point, the increased area SA of the rectangular region is an area obtained by subtracting the sum of the area S2 of the rectangular region A2 cut out from the first tile group and the area S3 of the rectangular area A3 cut out from the second tile group when the first and second tile groups are not merged from the area S1 of the rectangular region A1 cut out from tiles obtained by merging the first and second tile groups when the first and second tile groups are merged.

Accordingly, the binary image processing unit 34 sets, as coordinate values indicative of the position and the range of the rectangular region A2 cut out from the first tile group, the minimum x coordinate value $x_{2min}$, the maximum x coordinate value $x_{2max}$, the minimum y coordinate value $y_{2min}$, and the maximum y coordinate value $y_{2max}$. Additionally, the binary image processing units 34 sets, as coordinate values indicative of the position and the range of the rectangular region A3 cut out from the second tile group, the minimum x coordinate value $x_{3min}$, the maximum x coordinate value $x_{3max}$, the minimum y coordinate value $y_{3min}$, and the maximum y coordinate value $y_{3max}$. In this case, the areas S1, S2, and S3, and the increased area SA are calculated by employing the expressions (7) to (10).

After completing the procedure of S131, the binary image processing unit 34 calculates a threshold value SL' by employing the following expression (11) (S132), and determines whether or not the increased area SA is not more than the threshold value SL' (S133). The expression (11) is for adjusting the threshold value SL in accordance with the value of the number C1 (or the number C2).

$$SL'=SL \times C1 \qquad (11)$$

When SA>SL' is satisfied (NO in S133), it can be seen that the number of specific-pixel non-corresponding pixels included in the rectangular region A1 is large. Therefore, the binary image processing unit 34 terminates the vertical mergence process, and returns the processing to the original routine. In other words, the binary image processing unit 34 determines that the first and second tile groups are not merged.

When SA≦SL' is satisfied (YES in S133), it can be seen that the number of specific-pixel non-corresponding pixels included in the rectangular region A1 is small. Therefore, the binary image processing unit 34 refers to the tile setting table to assign the first tile group with the tile identifier assigned to the second tile group (S134), and updates the tile setting table (S135). In other words, the binary image processing unit 34 in S133 to S135 determines that the first and second tile groups are merged, and sets merged tiles.

For example, in the binary image 5 illustrated in FIG. 11, in the case of a target tile (1, 5), namely, a tile at coordinates (x, y)=(0, 16), and a tile (1, 4), namely, a tile at coordinates (x, y)=(0, 12), the areas S1, S2, S3=15, 9, 4 and the increased area SA=2 are satisfied. Since the threshold value SL'=6 is established, SA≦SL' is satisfied. Accordingly, as illustrated in FIG. 12, the target tile (1, 5) is assigned with the tile identifier "34" that is the same as that assigned to the tile (1, 4).

With the execution of the procedure of S135, the number of kinds of tile identifiers is reduced by one. Accordingly, after completing the procedure of S135, the binary image processing unit 34 decrements the variable r by "1" (S136). Lastly, the binary image processing unit 34 terminates the vertical mergence process, and returns the processing to the original routine.

According to the image forming apparatus 101 described above, the compression process section 3 determines whether or not adjacent tiles are to be merged on the basis of the increased area of the rectangular region that is derived from the area of the rectangular region in the case where the adjacent tiles are merged, and the area of the rectangular regions in the case where the adjacent tiles are not merged. That is, it is possible to determine whether or not the mergence is to be performed with simple arithmetic processing and short arithmetic processing time. As a result, the arithmetic processing time required to obtain a compressed image from an original image can be reduced.

Further, the number of rectangular regions cut out from individual binary images is minimized, and a portion where different rectangular regions overlap each other is also minimized. As a result, a data quantity of a compressed image can be minimized. In other words, compression efficiency can be improved. Furthermore, when the compressed image is decompressed, the arithmetic processing time required to reproduce an original image can be reduced.

Embodiment 2

Figure 24:
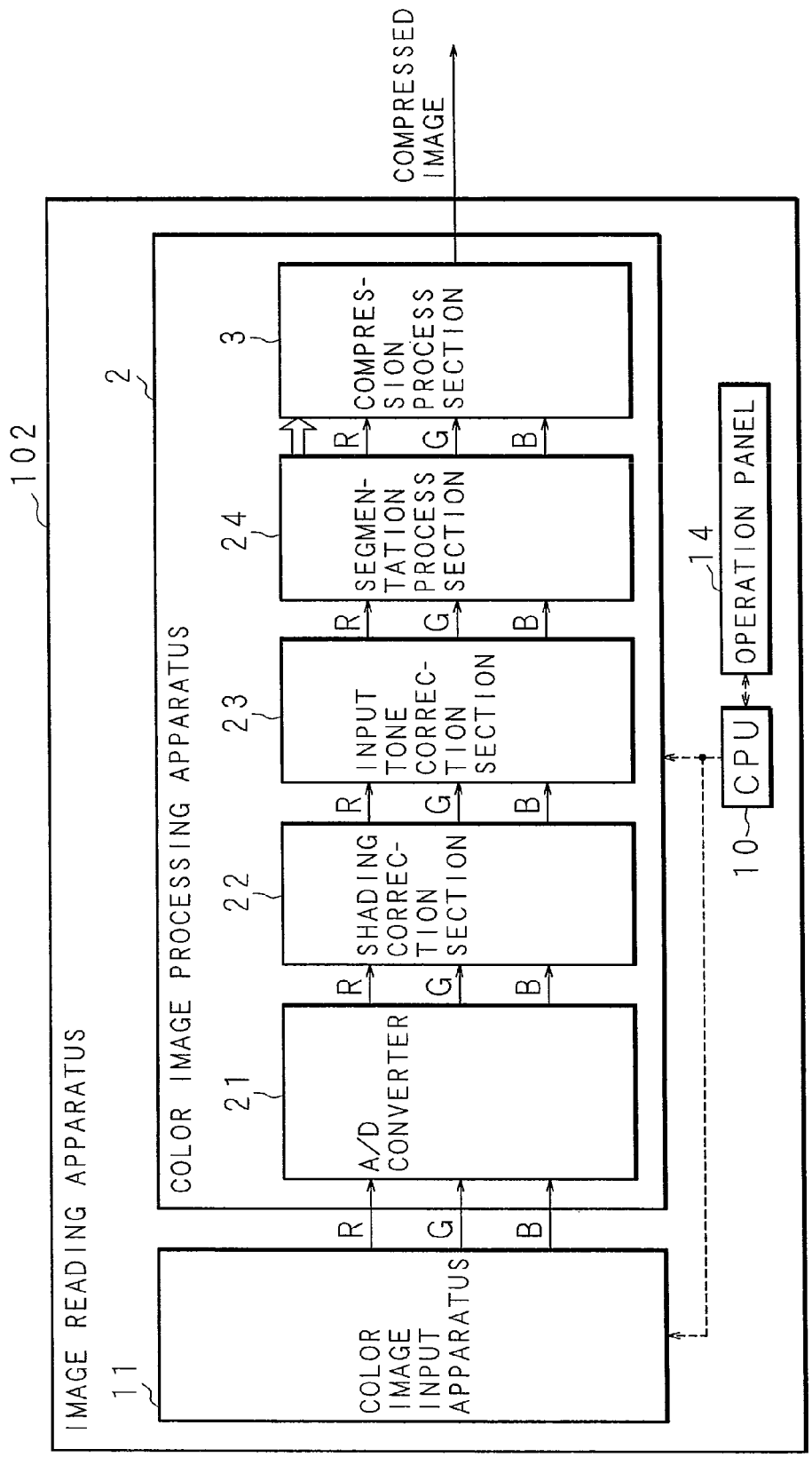
FIG. 24 is a block diagram illustrating a functional configuration of an image reading apparatus including a color image processing apparatus as an image compressing apparatus according to Embodiment 2 of the present invention.

FIG. 24 is a block diagram illustrating a functional configuration of an image reading apparatus 102 including the color image processing apparatus 2 as the image compressing apparatus according to Embodiment 2 of the present invention. FIG. 24 corresponds to FIG. 1 of Embodiment 1. In the present embodiment, the image reading apparatus 102 functioning as a flatbed scanner apparatus will be described by way example. The image reading apparatus 102 has a functional configuration similar to that of the image forming apparatus 101 of Embodiment 1. In the following description, differences between the image forming apparatus 101 and the image reading apparatus 102 will be described, and the description of parts corresponding to those in Embodiment 1 will be omitted by retaining the same reference numerals.

The image reading apparatus 102 includes the CPU 10, the color image input apparatus 11, the operation panel 14, and the color image processing apparatus 2, but, unlike the image forming apparatus 101 of Embodiment 1, the image reading apparatus 102 does not include the color image output apparatus 12 or the communication device 13. In addition, the color image processing apparatus 2 includes the A/D converter 21, the shading correction section 22, the input tone correction section 23, the segmentation process section 24, and the compression process section 3, but, unlike the color image processing apparatus 2 of Embodiment 1, the color image processing apparatus 2 does not include the image storage section 20, the color correction section 25, the black generation and under color removal section 26, the spatial filter process section 27, the output tone correction section 28, or the tone reproduction process section 29.

Similarly to the segmentation process section 24 of Embodiment 1, the segmentation process section 24 separates, on the basis of RGB signals inputted thereto, individual pixels into one of a text segment, a halftone segment, and a photographic-picture segment. However, the segmentation process section 24 outputs the segmentation result to the compression process section 3 (see an open arrow in the drawing), and also outputs the RGB signals (i.e., a color image) inputted thereto directly to the compression process section 3.

The foreground mask generating unit 31 (see FIG. 2) included in the compression process section 3 generates a foreground mask on the basis of the segmentation result inputted from the segmentation process section 24. In other words, the foreground mask generating unit 31 generates an image in which a pixel value of "0" is assigned to individual pixels indicated as the foreground by the inputted segmentation result, and a pixel value of "1" is assigned to individual pixels indicated as the background thereby, namely, the foreground mask.

Further, the image reading apparatus 102 includes a data communication device (not shown) that is comprised of, e.g., a network card connectable to a LAN cable. The data communication device communicates with a computer system or other digital multi-function peripherals connected to communication networks via the LAN cable. A compressed image outputted by the compression process section 3 is transmitted to the outside of the image reading apparatus 102 via the data communication device. The compressed image transmitted from the image reading apparatus 102 is sent to, e.g., an external file server. In this case, the compressed image is stored in a storage included in the file server.

The thus-configured image reading apparatus 102 achieves the effects similar to those of the image forming apparatus 101 of Embodiment 1. Note that the image reading apparatus 102 may also be a digital still camera. In this case, the image reading apparatus 102 may store the compressed image in a memory card inserted in the image reading apparatus 102.

Embodiment 3

In a computer-readable recording medium (hereinafter simply referred to as a recording medium), there is recorded a program code (an executable program, an intermediate code program, or a source program) of a computer program which a computer is caused to execute. The computer mentioned herein denotes, e.g., a microprocessor included in a personal computer, or a digital multi-function peripheral. The personal computer or the digital multi-function peripheral including the microprocessor will be designated as a computer system in the following description.

The recording medium of the present embodiment is a recording medium recording therein a program code for realizing an image compressing method in the embodiment of the present invention (hereinafter referred to as a computer program of the present embodiment).

When the recording medium of the present embodiment is separate from the computer system, the recording medium of the present embodiment can be provided in a portable manner. An example of such portable recording medium includes a flexible disk. When the recording medium of the present embodiment is the flexible disk, the computer system needs to include, as an external storage device, a flexible disk drive serving as a program code reading device. When the recording medium of the present embodiment is inserted into the external storage device, the computer program of the present embodiment that is recorded in the recording medium is read.

The recording medium of the present embodiment may be provided integrally with the computer system. In such a configuration, the computer program of the present embodiment is recorded in, e.g., a ROM or a hard disk included in the computer system.

The recording medium described above fixedly carries the computer program. As such a recording medium, there is used a tape system (a magnetic tape or a cassette tape); a disk system (a magnetic disk such as a flexible disk or a hard disk, or an optical disk such as a CD-ROM, a MO, a MD, or a DVD); a card system (an IC card such as a memory card or an optical card); or a semiconductor memory system {a mask ROM, an EPROM (Erasable Programmable Read Only Memory), an EEPROM (Electrically Erasable Programmable Read Only Memory), or a flash ROM}.

The computer program of the present embodiment may also be executed by the computer that directly accesses the recording medium of the present embodiment. Alternatively, the computer program of the present embodiment may also be executed after being installed in a program memory area of the computer system. A computer program for installing the computer program of the present embodiment from the recording medium of the present embodiment in the program memory area is contained in, e.g., a ROM of the computer system in advance.

When the computer system is configured to be connectable to a communication network such as the Internet, the computer program of the present embodiment may be executed after being downloaded to the program memory area of the computer system via the communication network. In this case, the communication network can be regarded as a recording medium that unfixedly carries the computer program.

A computer program for downloading the computer program of the present invention to the program memory area via the communication network is stored in, e.g., the ROM of the computer system in advance, or the computer program is installed in the program memory area from a recording medium different from the recording medium of the present embodiment. Note that the present invention can also be realized in the form of a computer data signal embedded in a carrier wave. In this case, the computer program of the present embodiment is embodied by electronic transmission.

The computer system functioning as an image reading apparatus includes, e.g., a personal computer, an image input apparatus such as a flatbed scanner apparatus, a film scanner apparatus, or a digital camera, an image display apparatus such as a CRT display or a liquid crystal display, and a communication device such as a network card or a modem for communicating with an external server or a digital multi-function peripheral via the communication network. When an image output apparatus such as a printer is added to the computer system described above, the computer system functions as the image forming apparatus in the embodiment of the present invention.

Figure 25:
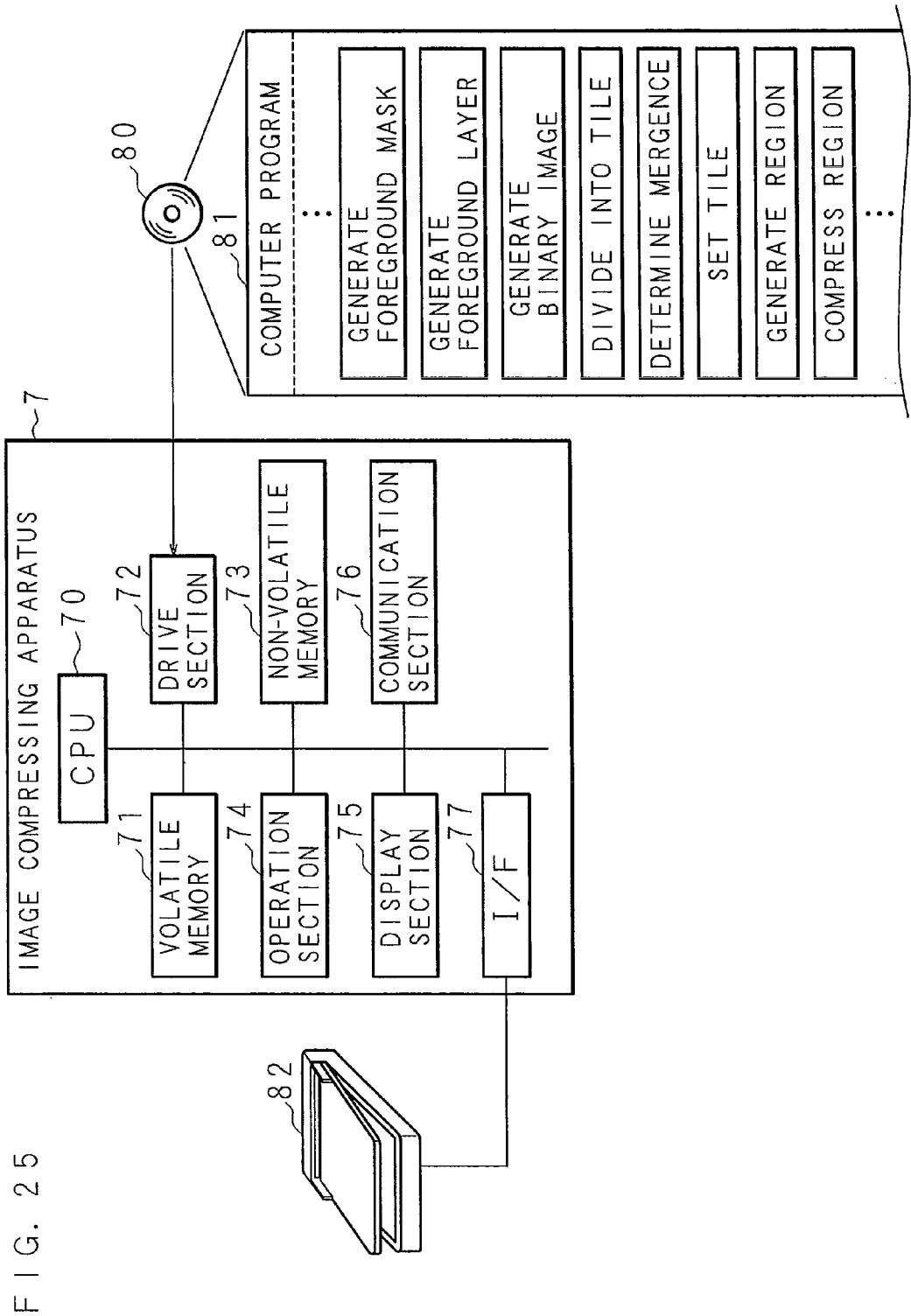
FIG. 25 is a block diagram illustrating a configuration of a principal portion of an image compressing apparatus according to Embodiment 3 of the present invention.

FIG. 25 is a block diagram illustrating a functional configuration of an image compressing apparatus 7 according to Embodiment 3 of the present invention. The image compressing apparatus 7 is comprised of a personal computer, and is a computer system functioning as the image processing apparatus of the present invention. The image compressing apparatus 7 includes a CPU 70, a volatile memory 71, a drive section 72, a non-volatile memory 73, an operation section 74, a display section 75, a communication section 76, and an I/F (interface) 77. The CPU 70 is a control center of the image compressing apparatus 7, controls individual components of the apparatus, and executes various processes using the volatile memory 71 as a working area. The drive section 72 is comprised of, e.g., a CD-ROM drive, and reads various information from a recording medium 80 set in the drive section 72.

The recording medium 80 is, e.g., an optical disk, and stores a computer program 81. The recording medium 80 and the computer program 81 respectively functions as the recording medium and the computer program in the embodiment of the present invention. The non-volatile memory 73 is comprised of, e.g., a hard disk. The CPU 70 reads the computer program 81 from the recording medium 80 set in the drive section 72, and causes the non-volatile memory 73 to store the read computer program 81. In addition, the CPU 70 loads the computer program 81 into the volatile memory 71, and realizes the image compressing method according to the embodiment of the present invention in accordance with the loaded computer program 81.

The operation section 74 is a keyboard or a pointing device for a user to operate the image compressing apparatus 7. Instructions or values inputted by the user with the operation section 74 are given to the CPU 70. The display section 75 is comprised of, e.g., a liquid crystal display, and is controlled by the CPU 70 to display various information.

The communication section 76 is configured to be connectable to the communication network (not shown). The CPU 70 executes transmission/reception of data with the outside of the image compressing apparatus 7 via the communication section 76. The I/F 77 connects the image compressing apparatus 7 and an image input apparatus 82 outside the image compressing apparatus 7.

The image input apparatus 82 is a scanner apparatus, a digital multi-function peripheral, or the like, and the image input apparatus 82 optically reads a document to generate a color image of RGB signals, and transmits the generated color image to the image compressing apparatus 7. The CPU 70 of the image compressing apparatus 7 receives the color image transmitted from the image input apparatus 82 via the I/F 77. The received color image is stored in the non-volatile memory 73.

Incidentally, when software for image generation is stored in the non-volatile memory 73, the CPU 70 may execute processing for generating the color image in accordance with inputted contents from the operation section 74. The generated color image is stored in the non-volatile memory 73.

When the image compressing method according to the embodiment of the present invention is realized, the CPU 70 executes, on the basis of the color image stored in the non-volatile memory 73, a foreground mask generation process generally similar to the foreground mask generation process executed in the foreground mask generating unit 31 of Embodiment 1. That is, the CPU 70 functions as the foreground mask generating unit in the embodiment of the present invention. Subsequently, the CPU 70 executes a foreground layer generation process generally similar to the foreground layer generation process executed in the foreground layer generating unit 32 of Embodiment 1. That is, the CPU 70 functions as the foreground layer generating unit in the embodiment of the present invention.

Further, the CPU 70 executes a background layer generation process generally similar to the background layer generation process executed in the background layer generating unit 33 of Embodiment 1. Furthermore, the CPU 70 executes a binary image division and mergence process generally similar to the binary image division and mergence process executed in the binary image processing unit 34 of Embodiment 1. That is, the CPU 70 functions as the binary image generating unit, the tile dividing unit, the mergence judging unit, the tile setting unit, the pre-judgment determining unit, and the on-judgment determining unit in the embodiment of the present invention.

Then the CPU 70 executes a compressed image generation process generally similar to the compressed image generation process executed in the image compressing unit 35 of Embodiment 1. That is, the CPU 70 functions as the region generating unit and the region compressing unit in the embodiment of the present invention. The thus-generated compressed image is stored in the non-volatile memory 73, or attached to an e-mail message to be transmitted to the outside. The image compressing apparatus 7 described above achieves the effects similar to those of the image forming apparatus 101 of Embodiment 1.

The foregoing embodiments are illustrative in all points and should not be construed to limit the present invention. The scope of the present invention is intended to include all modifications within the meanings and scopes of claims and equivalents. In addition, as long as the effects of the present invention are attained, components that are not disclosed in Embodiments 1 to 3 may be included in the image forming apparatus 101, the color image processing apparatus 2, the image compressing apparatus 7, the recording medium 80, and/or the computer program 81.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. An image compressing method for compressing an image consisting of a plurality of pixels, comprising steps of:
   generating, on the basis of the image, a foreground mask representing individual pixels of a foreground forming a text or a line art included in the image;
   generating, on the basis of the generated foreground mask and the image, a foreground layer obtained by replacing color information of each of the individual pixels of the foreground with N, wherein N is a natural number, kinds of foreground identifiers;
   generating, on the basis of the generated foreground layer, N binary images obtained by binarizing a specific foreground identifier and a pixel value other than the specific foreground identifier in correspondence to the N kinds of foreground identifiers;
   setting a plurality of tiles obtained by dividing each of the generated N binary images;
   determining whether or not, among the set tiles, adjacent tiles are to be merged in accordance with an area of one minimum rectangular region including all of pixels corresponding to a pixel having the specific foreground identifier in the foreground layer included in the adjacent tiles;
   setting tiles obtained by merging the adjacent tiles determined to be merged, and leaving the adjacent tiles determined not to be merged as they are;
   generating a minimum rectangular region including all of the pixels included in the set tiles by utilizing the binary images; and
   compressing the generated rectangular region.

2. An image compressing apparatus, having a processor, for compressing an image consisting of a plurality of pixels, comprising:

a foreground mask generating unit that generates, on the basis of the image, a foreground mask representing individual pixels of a foreground forming a text or a line art included in the image;

a foreground layer generating unit that generates, on the basis of the foreground mask generated by the foreground mask generating unit and the image, a foreground layer obtained by replacing color information of each of the individual pixels of the foreground with N, wherein N is a natural number, kinds of foreground identifiers;

a binary image generating unit that generates, on the basis of the foreground layer generated by the foreground layer generating unit, N binary images obtained by binarizing a specific foreground identifier and a pixel value other than the specific foreground identifier in correspondence to the N kinds of foreground identifiers;

a tile dividing unit that sets a plurality of tiles obtained by dividing each of the N binary images generated by the binary image generating unit;

a mergence determining unit that determines whether or not adjacent tiles are to be merged after the tile dividing unit sets the tiles in accordance with an area of one minimum rectangular region including all of pixels corresponding to a pixel having the specific foreground identifier in the foreground layer included in the adjacent tiles;

a tile setting unit that sets tiles obtained by merging the adjacent tiles determined to be merged by the mergence determining unit, and leaving the adjacent tiles determined not to be merged by the mergence determining unit as they are;

a region generating unit that generates a minimum rectangular region including all of the pixels included in the tiles set by the tile setting unit by employing the binary images; and a region compressing unit that compresses the rectangular region generated by the region generating unit.

3. The image compressing apparatus of claim 2, wherein the mergence determining unit determines that the adjacent tiles are merged when a result of subtracting a sum of areas of a plurality of minimum rectangular regions including the pixels included in the adjacent tiles from an area of the one minimum rectangular region is not more than a predetermined threshold value.

4. The image compressing apparatus of claim 3, further comprising:

a first determining unit that determines the threshold value to be used by the mergence determining unit in accordance with the number of tiles including the pixels among the tiles set by the tile dividing unit, and a predetermined upper limit value of the number of tiles including the pixels after the end of the setting by the tile dividing unit and before the start of determination by the mergence determining unit.

5. The image compressing apparatus of claim 3, further comprising:

a second determining unit that determines, every time the mergence determining unit makes determination, the threshold value to be used by the mergence determining unit in accordance with the number of tiles including the pixels among the tiles obtained by merging the adjacent tiles having been determined to be merged by the mergence determining unit, and leaving the adjacent tiles having been determined not to be merged by the mergence determining unit as they are, and a predetermined upper limit value of the number of tiles including the pixels.

6. The image compressing apparatus of claim 2, wherein in the case where the mergence determining unit determines not to merge the adjacent tiles, when the number of tiles including the pixels exceeds a predetermined upper limit value of the number of tiles including the pixels, the mergence determining unit determines to merge the adjacent tiles.

7. The image compressing apparatus of claim 2, wherein, when any of the pixels is not included in at least one of two adjacent tiles, the mergence determining unit determines that the two adjacent tiles are not merged.

8. An image forming apparatus, comprising:

the image compressing apparatus of claim 2; and an image forming unit that forms, on a recording sheet, an image obtained by decompressing an image compressed by the image compressing apparatus, or an image in correspondence to an image inputted to the image compressing apparatus.

9. A non-transitory recording medium in which a computer program for compressing an image consisting of a plurality of pixels is recorded, said computer program comprising:

a foreground mask generating step of causing a computer to generate, on the basis of the image, a foreground mask representing individual pixels of a foreground forming a text a line art included in the image;

a foreground layer generating step of causing the computer to generate, on the basis of the foreground mask generated in the foreground mask generating step and the image, a foreground layer obtained by replacing color information of each of the individual pixels of the foreground with N, wherein N is a natural number, kinds of foreground identifiers;

a binary image generating step of causing the computer to generate, on the basis of the foreground layer generated in the foreground layer generating step, N binary images obtained by binarizing a specific foreground identifier and a pixel value other than the specific foreground identifier in correspondence to the N kinds of foreground identifiers;

a tile dividing step of causing the computer to set a plurality of tiles obtained by dividing each of the N binary images generated in the binary image generating step;

a mergence determining step of causing the computer to determine whether or not adjacent tiles are to be merged after the tiles are set in the tile dividing step in accordance with an area of one minimum rectangular region including all of pixels corresponding to a pixel having the specific foreground identifier in the foreground layer included in the adjacent tiles;

a tile setting step of causing the computer to set tiles obtained by merging the adjacent tiles determined to be merged in the mergence determining step, and leaving the adjacent tiles determined not to be merged in the mergence determining step as they are;

a region generating step of causing the computer to generate a minimum rectangular region including all of the pixels included in the tiles set in the tile setting step by employing the binary images; and a region compressing step of causing the computer to compress the rectangular region generated in the region generating step.

* * * * *